United States Patent
Nagasato et al.

(10) Patent No.: US 10,436,313 B2
(45) Date of Patent: Oct. 8, 2019

(54) HYDRAULIC CONTROL DEVICE AND HYDRAULIC CONTROL METHOD FOR VEHICLE

(71) Applicant: TOYOTA JIDOSHA KABUSHIKI KAISHA, Toyota-shi, Aichi-ken (JP)

(72) Inventors: Yu Nagasato, Susono (JP); Hironori Asaoka, Numazu (JP); Yoshio Ito, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 23 days.

(21) Appl. No.: 15/821,188

(22) Filed: Nov. 22, 2017

(65) Prior Publication Data

US 2018/0149263 A1     May 31, 2018

(30) Foreign Application Priority Data

Nov. 25, 2016    (JP) ................................ 2016-229011

(51) Int. Cl.
| | |
|---|---|
| F16H 61/00 | (2006.01) |
| F16H 59/68 | (2006.01) |
| F16H 61/14 | (2006.01) |
| F16H 61/662 | (2006.01) |
| F16H 57/04 | (2010.01) |
| F16H 59/14 | (2006.01) |
| F16H 59/42 | (2006.01) |
| F16H 59/74 | (2006.01) |

(Continued)

(52) U.S. Cl.
CPC ..... *F16H 61/0025* (2013.01); *F16H 57/0436* (2013.01); *F16H 59/68* (2013.01); *F16H 61/143* (2013.01); *F16H 61/66227* (2013.01); *F16H 61/66259* (2013.01); *F16H 59/14* (2013.01); *F16H 59/42* (2013.01); *F16H 59/70* (2013.01); *F16H 59/74* (2013.01); *F16H 61/0031* (2013.01); *F16H 61/0206* (2013.01); *F16H 2059/147* (2013.01); *F16H 2059/743* (2013.01); *F16H 2061/0037* (2013.01)

(58) Field of Classification Search
None
See application file for complete search history.

(56) References Cited

U.S. PATENT DOCUMENTS

| | | | | |
|---|---|---|---|---|
| 4,693,081 A | * | 9/1987 | Nakamura | .......... F16H 61/0025 417/220 |
| 4,702,083 A | * | 10/1987 | Nakamura | ............ B60W 10/06 417/316 |

(Continued)

FOREIGN PATENT DOCUMENTS

| | | |
|---|---|---|
| DE | 102013201266 A1 | 7/2014 |
| JP | S61088056 A | 5/1986 |

(Continued)

*Primary Examiner* — Dirk Wright
(74) *Attorney, Agent, or Firm* — Hunton Andrews Kurth LLP

(57) ABSTRACT

The hydraulic control device includes: a mechanical variable-capacity oil pump; and an electronic control unit configured to calculate a target discharge volume of the mechanical variable-capacity oil pump using a plurality of parameters of the transmission, and control the mechanical variable-capacity oil pump based on the target discharge volume.

6 Claims, 17 Drawing Sheets

(51) Int. Cl.
*F16H 59/70* (2006.01)
*F16H 61/02* (2006.01)

(56) References Cited

U.S. PATENT DOCUMENTS

| | | | | |
|---|---|---|---|---|
| 7,726,948 B2* | 6/2010 | Hunter | .................. | F01M 1/16 |
| | | | | 417/213 |
| 8,182,238 B2* | 5/2012 | Frait | .................. | F16H 61/0021 |
| | | | | 417/220 |
| 9,309,792 B2* | 4/2016 | Long | .................. | F16H 61/42 |
| 9,477,231 B2* | 10/2016 | Miyata | .................. | F04B 49/02 |
| 9,500,107 B2* | 11/2016 | Takahata | .................. | F01L 1/34 |
| 9,709,163 B2* | 7/2017 | Long | .................. | F16H 61/42 |
| 9,885,423 B2* | 2/2018 | Takagi | .................. | F01L 1/3442 |
| 2015/0275710 A1 | 10/2015 | Takahata et al. | | |
| 2015/0377375 A1 | 12/2015 | Takagi et al. | | |
| 2018/0051795 A1* | 2/2018 | Terwart | .............. | F16H 57/0413 |

FOREIGN PATENT DOCUMENTS

| | | |
|---|---|---|
| JP | H02266153 A | 10/1990 |
| JP | 2013-148206 A | 8/2013 |
| JP | 2016-011680 A | 1/2016 |
| WO | 2015041589 A1 | 3/2015 |

\* cited by examiner

HYDRAULIC CONTROL DEVICE AND HYDRAULIC CONTROL METHOD FOR VEHICLE

INCORPORATION BY REFERENCE

The disclosure of Japanese Patent Application No. 2016-229011 filed on Nov. 25, 2016 including the specification, drawings and abstract is incorporated herein by reference in its entirety.

BACKGROUND

1. Technical Field

The present disclosure relates to a hydraulic control device and hydraulic control method for vehicle that supplies hydraulic pressure to a drive unit of the vehicle using a mechanical variable-capacity oil pump driven by an engine of the vehicle.

2. Description of Related Art

Generally, a discharge hydraulic pressure of an electric oil pump (EOP) mounted in vehicles can be controlled by controlling rotation speed of a motor that is an actuator of the EOP. In contrast, the discharge hydraulic pressure of a mechanical oil pump (MOP) mounted in vehicles cannot be controlled as it depends on engine rotation speed. However, the discharge hydraulic pressure of a mechanical variable-capacity oil pump (variable-capacity MOP) can be controlled though it depends on the engine rotation speed. Under such circumstances, Japanese Patent Application Publication No. 2016-011680 discloses a disclosure configured to detect an actual discharge hydraulic pressure of the variable-capacity MOP using an hydraulic pressure sensor, calculate a target discharge hydraulic pressure based on an engine rotation speed and a load factor, and feedback-control the actual discharge hydraulic pressure to achieve the target discharge hydraulic pressure based on a difference between the actual discharge hydraulic pressure and the target discharge hydraulic pressure.

SUMMARY

However, in order to feedback-control the actual discharge hydraulic pressure of the variable-capacity MOP to achieve the target discharge hydraulic pressure, a measuring device of the actual discharge hydraulic pressure, such as an hydraulic pressure sensor, is necessary. Accordingly, cost and disposition space for the measuring device of the actual discharge hydraulic pressure becomes necessary. When the engine rotation speed increases and thereby the amount of oil leakage from the variable-capacity MOP increases, the actual discharge hydraulic pressure falls below the target discharge hydraulic pressure. Accordingly, control is performed to increase a target discharge oil amount. However, when the target discharge oil amount is increased after an actual discharge hydraulic pressure deficiency is detected, there is a time lag until the actual discharge hydraulic pressure deficiency is resolved. This causes a problem in terms of responsiveness of the control of the mechanical variable-capacity oil pump.

The present disclosure is a vehicular hydraulic control device capable of controlling a mechanical variable-capacity oil pump with sufficient responsiveness without using a measuring device of an actual discharge hydraulic pressure.

According to one aspect of the disclosure includes a hydraulic control device for a vehicle. The vehicle includes an engine, and a transmission. The hydraulic control device includes: a mechanical variable-capacity oil pump driven by the engine, and configured to supply hydraulic pressure to a drive unit of the vehicle, an electronic control unit configured to (i) calculate a target discharge volume of the mechanical variable-capacity oil pump using a plurality of parameters of the transmission, and (ii) control the mechanical variable-capacity oil pump based on the target discharge volume. According to one aspect of the disclosure includes a hydraulic control method for a vehicle. The vehicle includes: an engine a transmission, a mechanical variable-capacity oil pump driven by the engine, and configured to supply hydraulic pressure to a drive unit of the vehicle; and an electronic control unit. The hydraulic control method includes (i) calculating, by the electronic control unit, a target discharge volume of the mechanical variable-capacity oil pump using a plurality of parameters of the transmission, and (ii) controlling, by the electronic control unit, the mechanical variable-capacity oil pump based on the target discharge volume. The plurality of parameters may include at least one of a target input torque of the transmission of the vehicle, a target discharge flow volume of the mechanical variable-capacity oil pump, and a rotation speed of an input shaft of the vehicle.

The electronic control unit may be configured to calculate a volumetric efficiency of the mechanical variable-capacity oil pump from the target input torque of the transmission and from the rotation speed of the input shaft, and set the target discharge volume to be larger as the volumetric efficiency becomes lower.

Such a configuration makes it possible to calculate the target discharge volume of the mechanical variable-capacity oil pump in consideration of the amount of oil leakage from the mechanical variable-capacity oil pump. Accordingly, even when the amount of oil leakage from the mechanical variable-capacity oil pump increases as the engine rotation speed becomes higher, the mechanical variable-capacity oil pump can be controlled with sufficient responsiveness as compared with the case of performing feedback-control of the mechanical variable-capacity oil pump.

The hydraulic control device further may include an electric oil pump configured to supply hydraulic pressure to the drive unit. The electronic control unit may be configured to: (i) calculate amount of fuel consumption of the engine corresponding to an increment of a driving electric power amount of the electric oil pump when the electric oil pump is driven at an operating point more efficient than a current operating point; (ii) compare the amount of fuel consumption of the engine corresponding to the increment of the driving electric power amount of the electric oil pump, with a decrease amount of fuel consumption of the engine caused by decrease in the discharge flow volume of the mechanical variable-capacity oil pump; and (iii) when the decrease amount is larger than the fuel consumption corresponding to the increment of a driving electric power amount of the electric oil pump, drive the electric oil pump at the operating point more efficient than the current operating point, with driving the mechanical variable-capacity oil pump such that the discharge flow volume of the mechanical variable-capacity oil pump is decreased.

According to such a configuration, the electric oil pump is driven at the driving point more efficient than the current operating point, and the discharge flow volume of the mechanical variable-capacity oil pump is decreased. Therefore, fuel efficiency can be enhanced.

The electronic control unit may be configured to set the target discharge volume of the mechanical variable-capacity oil pump to a maximum discharge volume, when fuel supply to the engine is stopped.

According to such a configuration, the target discharge volume of the mechanical variable-capacity oil pump is set to a maximum discharge volume, when fuel supply to the engine is stopped. Accordingly, the load of the electric oil pump can be decreased, and the power consumption of the electric oil pump can be reduced, which makes it possible to suppress deterioration of the fuel efficiency.

According to the vehicular hydraulic control device according to the present disclosure, a target discharge volume of the mechanical variable-capacity oil pump is calculated using the parameter about the drive unit of the vehicle, and the mechanical variable-capacity oil pump is controlled based on the calculated target discharge volume. This makes it possible to control the mechanical variable-capacity oil pump with sufficient responsiveness, without using the measuring device of an actual discharge hydraulic pressure.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

The configuration and operation of a vehicular hydraulic control device according to one embodiment of the present disclosure will be explained below with reference to the drawings.

Figure 1:
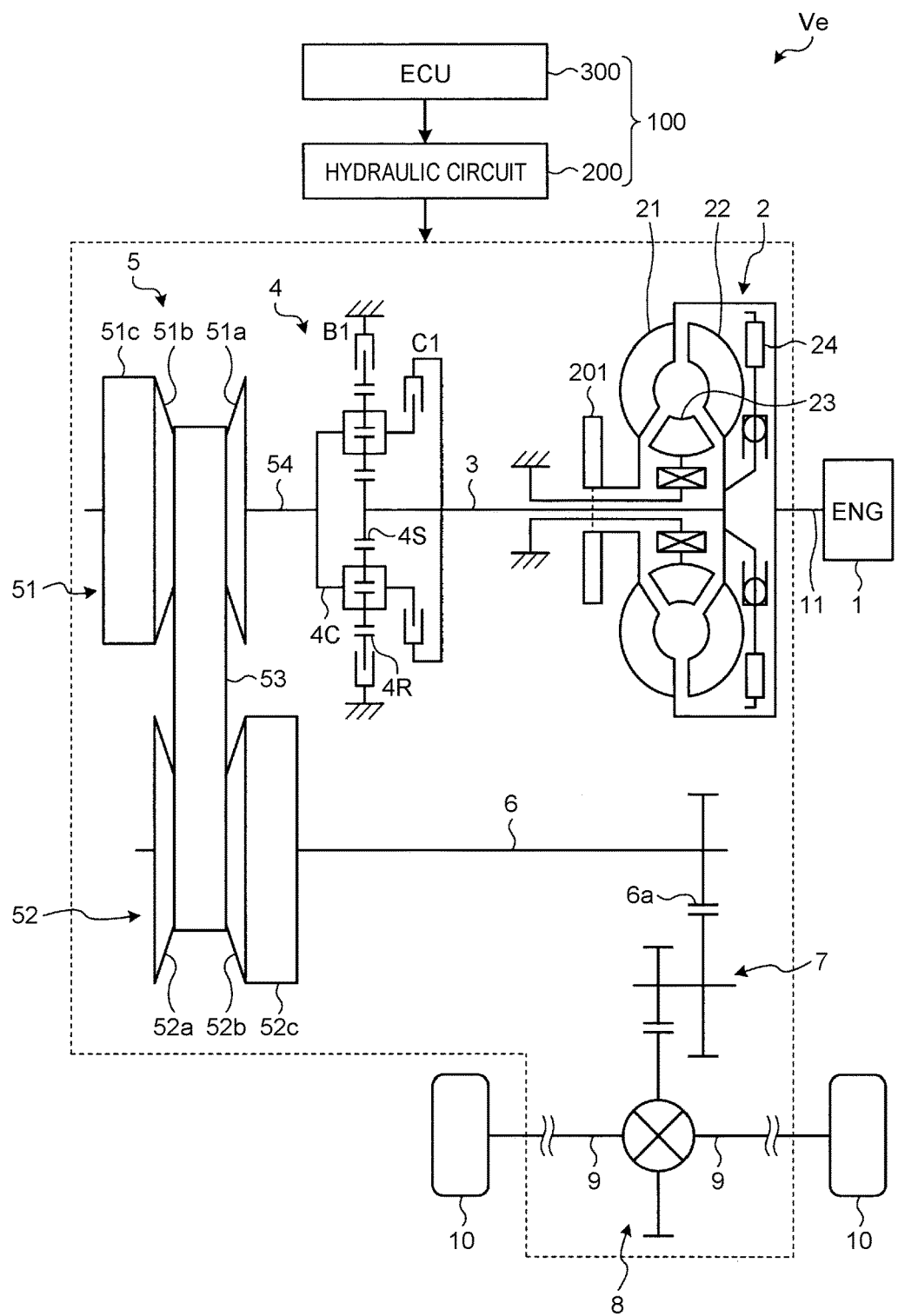
FIG. 1 is a schematic view illustrating one configuration example of a vehicle incorporating a vehicular hydraulic control device that is one embodiment of the present disclosure.

A description is now given of one configuration example of a vehicle that incorporates the vehicular hydraulic control device that is one embodiment of the present disclosure with reference to FIG. 1.

FIG. 1 is a schematic view illustrating one configuration example of the vehicle incorporating the vehicular hydraulic control device that is one embodiment of the present disclosure. As illustrated in FIG. 1, a vehicle Ve that incorporates the vehicular hydraulic control device that is one embodiment of the present disclosure includes an engine (ENG) 1 as a power source for traveling. Motive power output from the engine 1 is transmitted to driving wheels 10 through a torque converter 2, an input shaft 3, a forward-backward switching mechanism 4, a belt-type continuously variable transmission (CVT) 5, an output shaft 6, a counter gear mechanism 7, a differential gear 8, and axles 9. The vehicle Ve incorporates a hydraulic control device 100 that supplies hydraulic pressure to hydraulic pressure supply destinations of a drive unit of the vehicle Ve. The hydraulic control device 100 functions as a vehicular hydraulic control device that is one embodiment of the present disclosure.

The torque converter 2 is a fluid transmission device, the inside of which is filled with working fluid (oil). The torque converter 2 is controlled by a hydraulic control device 100. The torque converter 2 includes a pump impeller 21 integrally rotating with a crankshaft 11, a turbine runner 22 disposed facing the pump impeller 21, a stator 23 disposed between the pump impeller 21 and the turbine runner 22, and a lock-up clutch (LU clutch) 24.

The turbine runner 22 is coupled so as to integrally rotate with the input shaft (IN) 3. When the LU clutch 24 is engaged, the pump impeller 21 and the turbine runner 22 integrally rotate, so that the engine 1 is directly linked with the input shaft 3. When the LU clutch 24 is disengaged, the motive power output from the engine 1 is transmitted to the turbine runner 22 through the working fluid. The stator 23 is retained in a case through a one-way clutch.

The pump impeller 21 is coupled with a dual-port mechanical variable-capacity oil pump (variable-capacity MOP) 201. The variable-capacity MOP 201, which is coupled with the engine 1 through the pump impeller 21, is driven by the engine 1. The variable-capacity MOP 201 and the pump impeller 21 may be coupled through a transmission mechanism, such as a belt mechanism.

The input shaft 3 is coupled with the forward-backward switching mechanism 4 that is composed of a double pinion-type planetary gear mechanism. When an output torque of the engine 1 is transmitted to the driving wheels 10, the forward-backward switching mechanism 4 switches a direction of the torque acting on the driving wheel 10 to a forward direction or a backward direction. The forward-backward switching mechanism 4 includes a sun gear 4S, a ring gear 4R disposed to be concentric with the sun gear 4S, and a carrier 4C that rotationally and revolvably retains a first pinion gear and a second pinion gear. The sun gear 4S is coupled so as to integrally rotate with the input shaft 3. The carrier 4C is coupled so as to integrally rotate with a primary shaft 54 of the CVT 5.

The forward-backward switching mechanism 4 includes a clutch C1 and a brake B1. The clutch C1 selectively rotates the sun gear 4S and the carrier 4C integrally. The brake B1 selectively fixes the ring gear 4R to be unrotatable. The clutch C1 and the brake B1 are each hydraulic. The hydraulic control device 100 supplies hydraulic pressure to a hydraulic actuator of the clutch C1 and a hydraulic actuator of the brake B1.

When the clutch C1 is engaged, and the brake B1 is disengaged, the entire forward-backward switching mechanism 4 integrally rotates, so that the primary shaft 54 of the CVT 5 and the input shaft 3 integrally rotate. When the clutch C1 is disengaged, and the brake B1 is engaged, the sun gear 4S and the carrier 4C rotate in a reverse direction, so that the primary shaft 54 rotates reversely to the input shaft 3. When the clutch C1 is disengaged, and the brake B1 is disengaged, the forward-backward switching mechanism 4 is in the state of being neutral (neutral state). Accordingly, the engine 1 and the CVT 5 are disengaged so as to disable the torque to be transmitted.

The CVT 5 includes a primary pulley 51 integrally rotating with the primary shaft 54, a secondary pulley 52 integrally rotating with the output shaft 6, and an endless belt 53 wound around V-grooves of the pulleys 51, 52. The gear ratio of the CVT 5 is continuously changed as the V-groove widths of the pulleys 51, 52 changes and a winding diameter of the belt 53 changes.

The primary pulley 51 includes a fixed sheave 51a integrated with the primary shaft 54, a movable sheave 51b that axially moves on the primary shaft 54, and a hydraulic cylinder 51c that imparts thrust to the movable sheave 51b. The hydraulic cylinder 51c is disposed at a back surface side of the movable sheave 51b to generate the thrust for moving the movable sheave 51b to the fixed sheave 51a side. The hydraulic control device 100 supplies hydraulic pressure to the hydraulic cylinder 51c.

The secondary pulley 52 includes a fixed sheave 52a integrated with the output shaft 6, a movable sheave 52b that axially moves on the output shaft 6, and a hydraulic cylinder 52c that imparts thrust to the movable sheave 52b. The hydraulic cylinder 52c is disposed at a back surface side of the movable sheave 52b to generate the thrust for moving the movable sheave 52b to the fixed sheave 52a side. The hydraulic control device 100 supplies hydraulic pressure to the hydraulic cylinder 52c.

The output shaft 6 integrally rotates with an output gear 6a. The output shaft 6 is coupled with the differential gear 8 through the counter gear mechanism 7 that engages with the output gear 6a. The differential gear 8 is coupled with the right and left driving wheels 10, 10 through the right and left axles 9, 9.

The hydraulic control device 100 includes a hydraulic circuit 200 that supplies hydraulic pressure to the hydraulic pressure supply destinations of the vehicle Ve, and an electronic control unit (referred to as "ECU" below) 300 that electrically controls the hydraulic circuit 200.

The hydraulic circuit 200 supplies oil (hydraulic pressure) to each of the hydraulic cylinders 51c, 52c of the CVT 5, the hydraulic actuators of the clutch C1 and the brake B1, the inside of the torque converter 2, and parts of the drive unit of the vehicle Ve that require lubrication. The ECU 300 outputs a hydraulic pressure command signal to the hydraulic circuit 200 to control shifting operation of the CVT 5, and each engagement device such as the clutch C1. That is, the ECU 300 electrically controls the hydraulic circuit 200 so as to execute control such as forward and backward switchover control and CVT 5 shifting control.

Next, the configuration of the hydraulic circuit 200 will be described with reference to FIG. 2.

Figure 2:
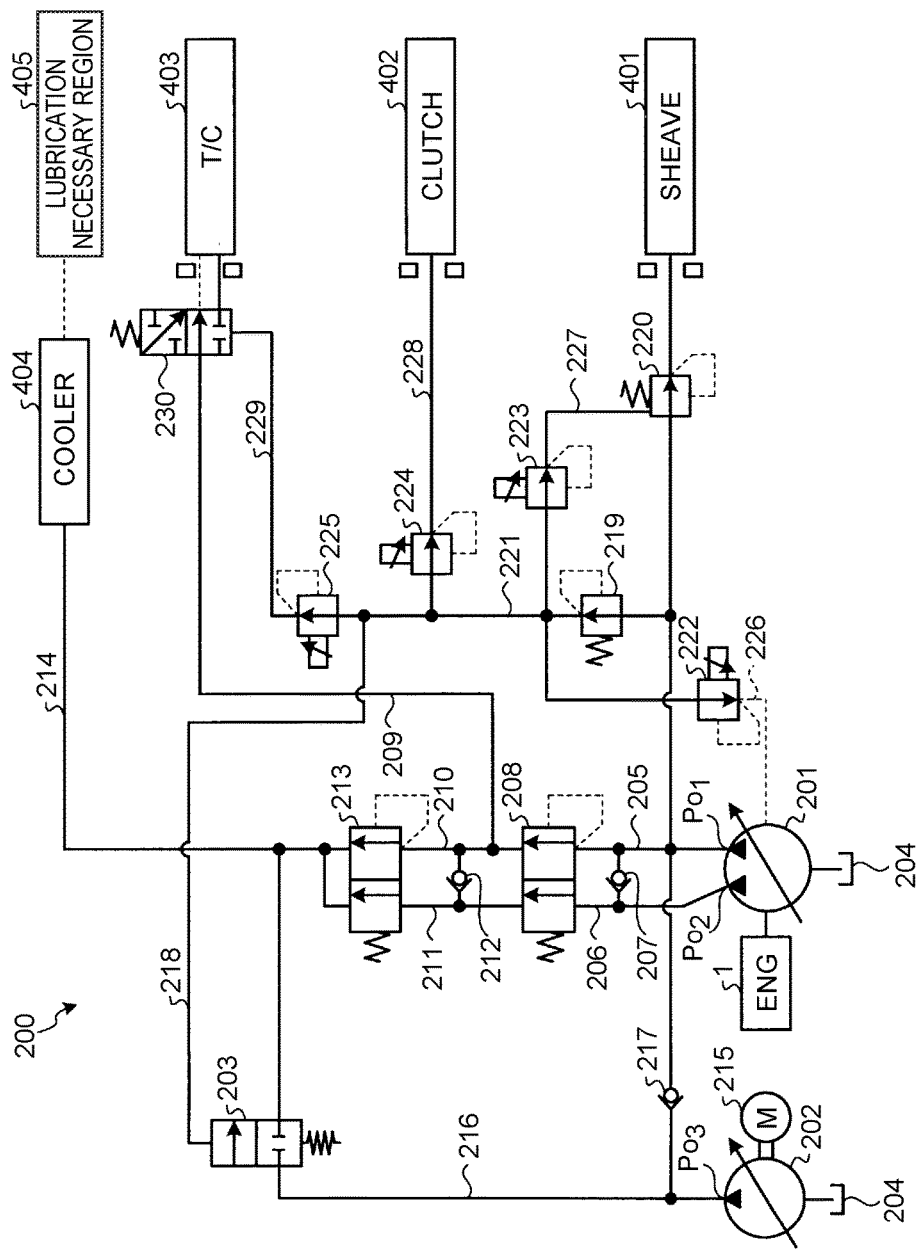
FIG. 2 is a circuit diagram illustrating the configuration of a hydraulic circuit illustrated in FIG. 1.

FIG. 2 is a circuit diagram illustrating the configuration of the hydraulic circuit 200. As illustrated in FIG. 2, the hydraulic circuit 200 controls the hydraulic pressure to be two control pressures: a line pressure; and a lubrication pressure. The hydraulic circuit 200 supplies oil corresponding to each control pressure to oil supply destinations of the drive unit. The supply destinations of a line pressure system include a sheave 401, a clutch 402, and a torque converter (hereinafter called T/C) 403. The supply destinations of a lubrication pressure system include a cooler 404 and a lubrication necessary region 405. The sheave 401 includes each of the hydraulic cylinders 51c, 52c of the CVT 5 illustrated in FIG. 1. The clutch 402 includes the hydraulic actuator of the clutch C1 and the hydraulic actuator of the brake B1 illustrated in FIG. 1. The T/C 403 includes the torque converter 2 illustrated in FIG. 1. The lubrication necessary region 405 includes rotating members, such as the gear (for example, the forward-backward switching mechanism 4) of the drive unit illustrated in FIG. 1.

The hydraulic circuit 200 includes the variable-capacity MOP 201 and the single-port electric oil pump (EOP) 202 as a hydraulic pressure supply source. The variable-capacity MOP 201 has a main port $Po_1$ and a sub-port $Po_2$. The oil discharged from the main port $Po_1$ is supplied to the supply destinations of the line pressure system, and the oil discharged from the sub-port $Po_2$ is supplied to the supply destinations of the lubrication pressure system. Meanwhile, the EOP 202 has a discharge port $Po_3$. The oil discharged from the discharge port $Po_3$ is supplied to the supply destinations of the lubrication pressure system. That is, in the hydraulic circuit 200, the circuits using the variable-capacity MOP 201 as a hydraulic pressure supply source are connected to the circuits using the EOP 202 as a hydraulic pressure supply source. Accordingly, it is possible to add (assist) the flow volume of the oil discharged from the EOP 202 to (with) the flow volume of the oil supplied to the supply destinations of the lubrication pressure system from the variable-capacity MOP 201.

The hydraulic circuit 200 includes a switching valve 203 that switches connection and disconnection of a line extending from the discharge port $Po_3$ of the EOP 202 to the supply destinations of the lubrication pressure system. In the hydraulic control device 100, whether or not the EOP 202 assists the oil supplied to the supply destinations of the lubrication pressure system can be switched by switchover control of the switching valve 203. Specifically, the variable-capacity MOP 201, which is driven by the engine (ENG) 1, sucks oil in an oil pan 204 and discharges the oil through the main port $Po_1$ and the sub-port $Po_2$. The variable-capacity MOP 201 is configured such that a ratio (port ratio) of the discharge flow volume of the main port $Po_1$ to the discharge flow volume of sub-port $Po_2$ can be changed.

The main port $Po_1$ is connected to an oil passage 205, and the sub-port $Po_2$ is connected to an oil passage 206. The oil passage 206 is connected to the oil passage 205 via a check valve 207. The check valve 207 is closed when the hydraulic pressure on the oil passage 206 side is lower than the hydraulic pressure on the oil passage 205 side. When the hydraulic pressure on the oil passage 206 side is higher than the hydraulic pressure on the oil passage 205 side, the check valve 207 is opened. Accordingly, when the hydraulic pressure on the oil passage 206 side is higher than the hydraulic pressure on the oil passage 205 side, the oil discharged from the sub-port $Po_2$ is supplied to the oil passage 205 side through the check valve 207.

The oil passage 205 and the oil passage 206 are connected to an inlet side of a line pressure regulation valve 208, while an outlet side of the line pressure regulation valve 208 is connected to an oil passage 209, an oil passage 210, and an oil passage 211. The line pressure regulation valve 208 is operated by the hydraulic pressure from the oil passage 205 and pressing force of an elastic body such that the hydraulic pressure in the oil passage 205 is regulated to be a target line pressure. When the hydraulic pressure in the oil passage 205 is regulated to be the target line pressure, the line pressure regulation valve 208 discharges the hydraulic pressure in the oil passage 205 to the oil passages 209, 210. The oil passage 211 is connected to the oil passage 210 via a check valve 212. The check valve 212 is closed when the hydraulic pressure on the oil passage 211 side is lower than the hydraulic pressure on the oil passage 210 side. When the hydraulic pressure on the oil passage 211 side is higher than the hydraulic pressure on the oil passage 210 side, the check valve 212 is opened.

The oil passage 210 and the oil passage 211 are connected to an inlet side of a secondary pressure regulation valve 213, while an outlet side of the secondary pressure regulation valve 213 is connected to an oil passage 214. The secondary pressure regulation valve 213 is operated by the hydraulic pressure from the oil passage 210 and the pressing force of the elastic body such that the hydraulic pressure in the oil passages 209, 210 is regulated to be a secondary pressure. When the hydraulic pressure in the oil passages 209, 210 is regulated to be the secondary pressure, the secondary pressure regulation valve 213 discharges the hydraulic pressure in the oil passage 210 to the oil passage 214. The oil passage 214 is connected to the cooler 404 and supplies oil to the lubrication necessary region 405 through the cooler 404.

The EOP 202, which is driven by an electric motor (M) 215, sucks oil in the oil pan 204, and discharges the oil from the discharge port $Po_3$. The electric motor 215, which is drive-controlled by the ECU 300, is electrically connected to a battery (not illustrated). The discharge port $Po_3$ is connected to an oil passage 216. The oil passage 216 is connected to the oil passage 205 via a check valve 217.

The oil passage 216 is connected to the switching valve 203. Opening and closing of the switching valve 203 is switched in accordance with a signal pressure having the hydraulic pressure in the oil passage 205 as a source pressure, the hydraulic pressure being input from an oil passage 218. When the switching valve 203 is opened, the oil discharged from the discharge port $Po_3$ flows from the oil passage 216 to the oil passage 214 through the switching valve 203. The oil flows through the oil passage 214 as a lubrication pressure oil and is supplied to the supply destinations of the lubrication pressure system. When the switching valve 203 is closed, the oil discharged from the discharge port $Po_3$ flows from the oil passage 216 to the oil passage 205 through the check valve 217.

Thus, the switching valve 203 switches between the circuits that supply the oil discharged from the discharge port $Po_3$ to the supply destinations of the lubrication pressure system and the circuits that supply the oil discharged from the discharge port $Po_3$ to the supply destinations of the line pressure system. The check valve 217 is closed when the hydraulic pressure on the oil passage 216 side is lower than the hydraulic pressure on the oil passage 205 side. When the hydraulic pressure on the oil passage 216 side is higher than the hydraulic pressure on the oil passage 205 side, the check valve 217 is opened. Accordingly, when the hydraulic pressure on the oil passage 216 side is higher than the hydraulic pressure on the oil passage 205 side, the oil discharged from the discharge port $Po_3$ is supplied to the supply destinations of the line pressure system through the check valve 217.

The oil passage 205 of the line pressure system is connected to pressure reduction valves 219, 220. The pressure reduction valves 219, 220 are electrically controlled by the ECU 300. The pressure reduction valve 219 reduces the line pressure, and supplies the reduced line pressure to an oil passage 221. The pressure reduction valve 220 reduces the line pressure, and supplies the reduced line pressure to a sheave 401.

The oil passage 221 is connected to solenoid valves 222, 223, 224, 225. The solenoid valves are each electrically controlled by the ECU 300. The oil led through the solenoid valve 222 is supplied to the variable-capacity MOP 201 through an oil passage 226, so that the discharge volume of the variable-capacity MOP 201 is variably controlled.

The solenoid valve 223 is a valve that regulates a signal pressure input into a pressure reduction valve 220 through an oil passage 227. The solenoid valve 224 is a valve that regulates the hydraulic pressure (engagement pressure) of the clutch 402. The solenoid valve 224 regulates the hydraulic pressure supplied to the clutch 402 with the line pressure as a source pressure. The oil whose pressure is regulated with the solenoid valve 224 is supplied to the clutch 402 through an oil passage 228.

The solenoid valve 225 is a valve that regulates the hydraulic pressure (lock-up engagement pressure) of the T/C 403. The solenoid valve 225 regulates the hydraulic pressure supplied to the T/C 403 with the line pressure as a source pressure. The oil whose pressure is regulated with the solenoid valve 225 is supplied to the T/C 403 through an oil passage 229, and is supplied to an engagement-side hydraulic pressure chamber between the back surface side of the turbine runner 22 and the LU clutch 24 in the T/C 403.

The T/C 403 is connected to a switching valve 230. The switching valve 230 regulates the hydraulic pressure supplied to a disengagement-side hydraulic pressure chamber between the LU clutch 24 and a front cover in the T/C 403 with the line pressure supplied from the oil passage 209 as a source pressure. Thus, the T/C 403 switches the supply state of the hydraulic fluid pressure supplied to the engagement-side hydraulic pressure chamber and the disengagement-side hydraulic pressure chamber using the solenoid valve 225 and the switching valve 230, so that the operation state of the LU clutch 24 is switched.

Figure 3:
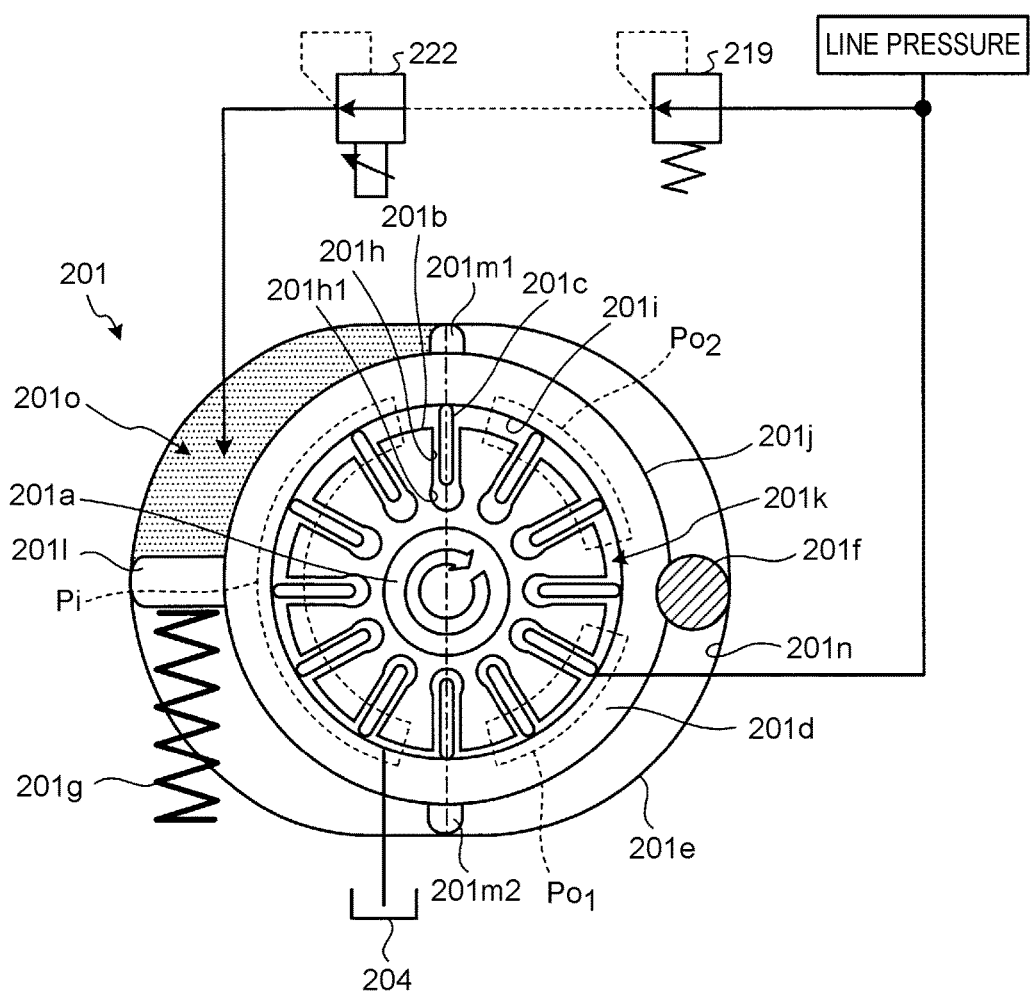
FIG. 3 is a schematic view illustrating one configuration example of a variable-capacity MOP illustrated in FIG. 1.

A description is now given of the configuration of the variable-capacity MOP 201 with reference to FIG. 3.

FIG. 3 is a schematic view illustrating one configuration example of the variable-capacity MOP 201. As illustrated in FIG. 3, the variable-capacity MOP 201 includes a rotary shaft body 201a, a rotor 201b, a plurality of vanes 201c, a cam ring 201d, an outer case 201e, a shaking pin 201f, and a spring 201g.

The rotor 201b, which is composed of a cylindrical member, is fixedly coupled with the rotary shaft body 201a extending through the rotor 201b. A vane groove 201h is formed in a plurality of locations in a circumferential direction of the rotor 201b. The vanes 201c, which are each composed of a plate-like member, are attached in the vane grooves 201h of the rotor 201b.

The tips of the vanes 201c are pressed to and thereby brought into contact with an inner peripheral surface 201i of the cam ring 201d by the pressure of a high-pressure oil introduced into bottom space 201h1 of the vane grooves 201h. As the rotor 201b rotates, the vanes 201c slide in a radial direction inside the vane grooves 201h and thereby repeatedly move in a direction of being pushed out of the vane grooves 201h or a direction of being pressed into the vane grooves 201h.

The cam ring 201d, which is composed of a tubular member, has the inner peripheral surface 201i that forms a cam surface and a circular outer peripheral surface 201j. The cam ring 201d houses the rotor 201b and the vanes 201c in an inside of the tubular member, i.e., an area surrounded with the inner peripheral surface 201i. An oil chamber 201k is formed between the inner peripheral surface 201i and the rotor 201b.

The cam ring 201d is disposed with a specified eccentric amount from the rotor 201b. Accordingly, the oil chamber 201k has an area where a radial interval between the inner peripheral surface 201i and the outer peripheral surface of the rotor 201b is large and an area where the radial interval is narrow. The cam ring 201d includes protrusions 201l, 201m1, 201m2 radially protruding from the outer peripheral surface 201j. The protrusions 201l, 201m1, 201m2 slidably come into contact with an inner peripheral surface 201n of the outer case 201e.

The shaking pin 201f is provided along the shaft direction between the outer peripheral surface 201j of the cam ring 201d and the inner peripheral surface 201n of the outer case 201e. The shaking pin 201f shakably supports the cam ring 201d on the inner peripheral surface 201n of the outer case 201e.

The spring 201g is provided such that one end of the spring 201g abuts against the protrusion 201l provided in the cam ring 201d. The spring 201g biases the cam ring 201d in the direction of maximizing the capacity (pump capacity) of the oil chamber 201k.

In the variable-capacity MOP 201 configured in this way, when the rotary shaft body 201a is rotated by the engine 1, the rotor 201b rotates while the vanes 201c slide inside the vane grooves 201h. When the rotor 201b rotates, the capacity of the oil chamber 201k on an upstream side in a rotation direction of the rotor, which is surrounded with the adjacent vanes 201c and the inner peripheral surface 201i of the cam ring 201d, is expanded with the rotation of the rotor 201b, so that the oil in the oil pan 204 is sucked through an intake port Pi. On the contrary, the capacity of the oil chamber 201k on an downstream side in the rotation direction of the rotor, which is surrounded with the adjacent vanes 201c and the inner peripheral surface 201i of the cam ring 201d, decreases with the rotation of the rotor 201b, so that the oil is discharged from the main port $Po_1$ and the sub-port $Po_2$.

The variable-capacity MOP 201 configured in this way has a variable-control hydraulic pressure chamber 201o defined by the inner peripheral surface 201n of the outer case 201e, the protrusions 201l, 201m1, and the outer peripheral surface 201j of the cam ring 201d. Controlling the hydraulic pressure supplied into the variable-control hydraulic pressure chamber 201o enables the cam ring 201d to stroke against the biasing force of the spring 201g so as to change the capacity of the oil chamber 201k. As a result, the discharge volume of the variable-capacity MOP 201 can be controlled. The hydraulic pressure inside the variable-control hydraulic pressure chamber 201o is controlled by regulating the line pressure through the pressure reduction valve 219 and the solenoid valve 222.

In the vehicular hydraulic control device having such a configuration, the ECU 300 executes hydraulic control processing described below. As a result, the variable-capacity MOP 201 is controlled with sufficient responsiveness without using a measuring device of an actual discharge hydraulic pressure. The operation of the ECU 300 executing the hydraulic control processing will be described below with reference to FIGS. 4 to 7.

Figure 4:
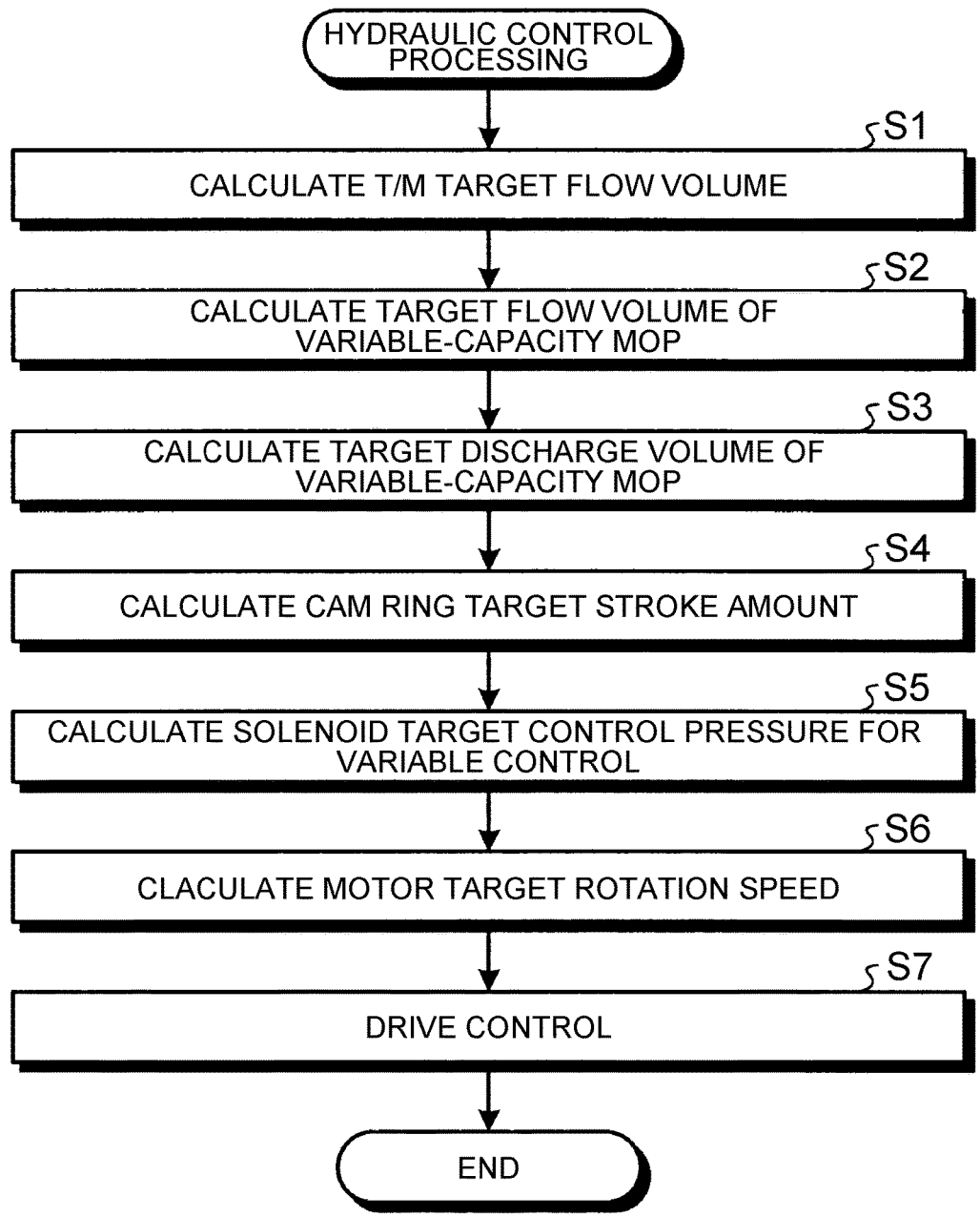
FIG. 4 is a flowchart illustrating the flow of hydraulic control processing that is one embodiment of the present disclosure.
Figure 5:
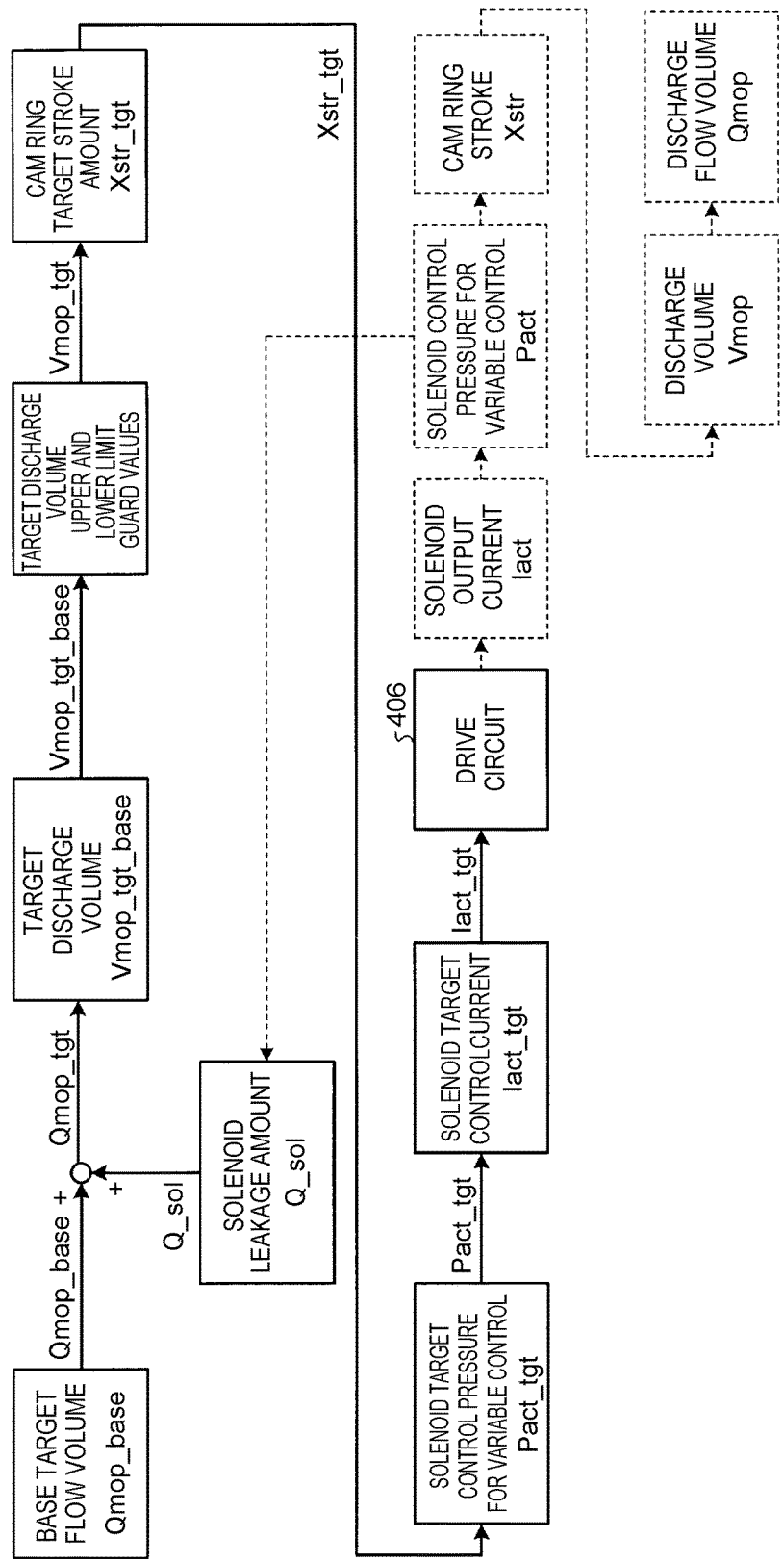
FIG. 5 is a control flow chart for describing the flow of the hydraulic control processing that is one embodiment of the present disclosure.
Figure 6:
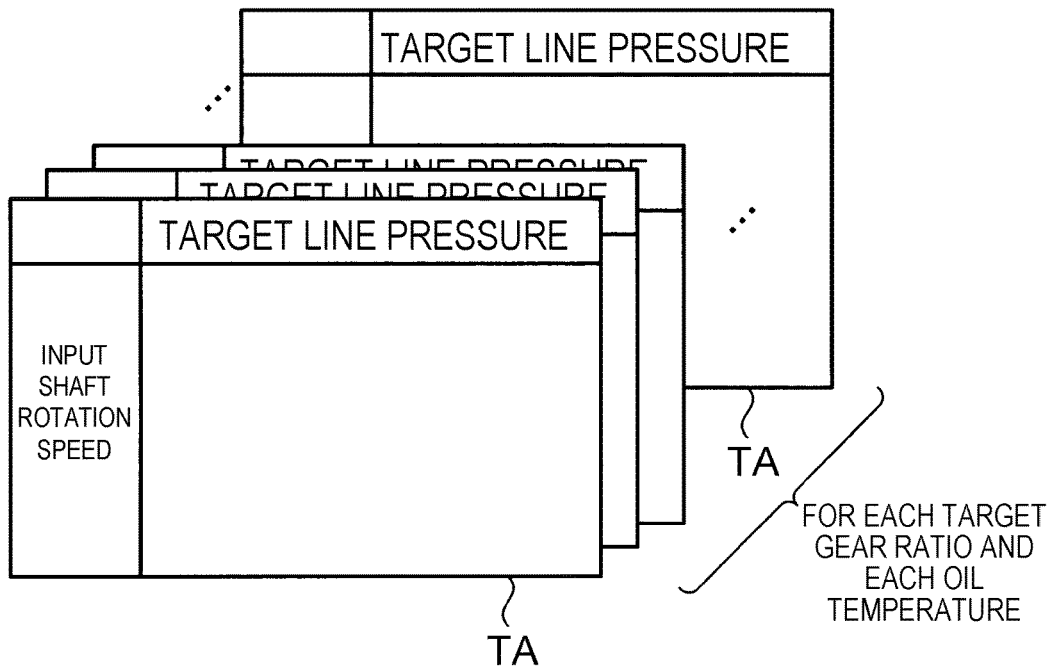
FIG. 6 is a schematic view for describing a calculation method for a target flow volume of a CVT.
Figure 7:
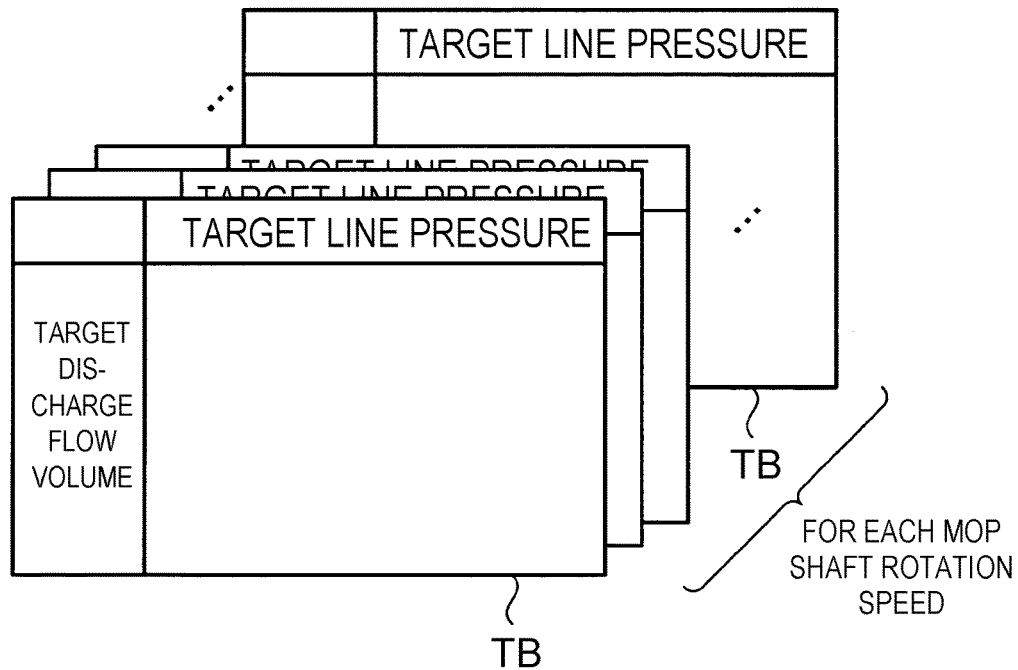
FIG. 7 is a schematic view for describing a calculation method for a target discharge volume of the variable-capacity MOP.

FIG. 4 is a flowchart illustrating the flow of the hydraulic control processing that is one embodiment of the present disclosure. FIG. 5 is a control flow chart for describing the flow of the hydraulic control processing that is one embodiment of the present disclosure. FIG. 6 is a schematic view for describing a calculation method for a target flow volume of the CVT 5. FIG. 7 is a schematic view for describing a calculation method for a target discharge volume of the variable-capacity MOP 201.

The flowchart illustrated in FIG. 4 starts at the timing when an ignition switch of the vehicle Ve is switched from an ON state to an OFF state. Then, the hydraulic control processing proceeds to step S1.

In the processing of step S1, the ECU 300 uses a target line pressure PL of the hydraulic circuit 200 (a target input torque of the CVT 5), a rotation speed of the input shaft 3 (input shaft rotation speed), a target gear ratio of the CVT 5, and a temperature of oil (oil temperature) in the oil pan 204 to calculate, as a T/M target flow volume, a sum of an oil flow volume (sheave-clutch control system flow volume) $Q_{pl}$ required for the sheave 401 and the clutch 402, an oil flow volume $Q_{sec}$ required for the T/C 403 (T/C control system flow volume), and an oil flow volume (lubrication flow volume) $Q_{lub}$ required for the cooler 404 and the lubrication necessary region 405.

Specifically, the ECU 300 stores maps TA that indicate relation among the target line pressure PL, the input shaft rotation speed, the target gear ratio, the oil temperature, and the T/M target flow volume obtained in advance by experiments or simulation as illustrated in FIG. 6. The ECU 300 reads the T/M target flow volume corresponding to current target line pressure PL, input shaft rotation speed, target gear ratio, and oil temperature from the stored maps TA. Accordingly, the processing of step S1 is completed, and the hydraulic control processing proceeds to step S2.

The sheave-clutch control system flow volume $Q_{pl}$ includes, for example, the amount of oil leakage (dependent on the target line pressure PL, the input shaft rotation speed, and the oil temperature) in the valves and sealing members included in the sheave-clutch control system. The sheave-clutch control system flow volume $Q_{pl}$ also includes the flow volume of moving oil (dependent on the target gear ratio) in the pulleys, the flow volume of oil filled in a clutch pack (dependent on a gear stage in the case of AT vehicles), and the flow volume of priority orifice oil (dependent on the oil temperature) from the line pressure system to the secondary pressure system.

The T/C control system flow volume $Q_{sec}$ includes the amount of oil leakage (dependent on the target line pressure PL, the input shaft rotation speed, and the oil temperature) in the valves and sealing members included in the T/C control system, the flow volume of oil returned to the T/C control system, the flow volume of priority orifice oil (dependent on the oil temperature) from the secondary pressure system to the lubrication pressure system. The lubrication flow volume $Q_{lub}$ includes, for example, the flow volume of oil (dependent on the oil temperature) that flows into the lubrication necessary part, and the flow volume of drain oil (dependent on the oil temperature), such as in a pressure-side strainer.

In processing of step S2, the ECU 300 uses the T/M target flow volume calculated in the processing of step S1 to calculate a target discharge flow volume and a target discharge hydraulic pressure of the variable-capacity MOP 201 and EOP 202 (discharge flow volume and discharge hydraulic pressure calculation processing). The detail of the discharge flow volume and discharge hydraulic pressure calculation processing is described below with reference to FIGS. 8 and 9. Accordingly, the processing of step S2 is completed, and the hydraulic control processing proceeds to step S3.

In the processing of step S3, the ECU 300 uses the target discharge flow volume of the variable-capacity MOP 201 calculated in the processing of step S2, the target line pressure PL of the hydraulic circuit 200, and a rotation speed (MOP shaft rotation speed) Nmop of the variable-capacity MOP 201 to calculate a target discharge volume (the amount of oil dischargeable from one oil chamber per one revolution (cc/rev)) Vmop_tgt of the variable-capacity MOP 201. The ECU 300 calculates the MOP shaft rotation speed Nmop using the input shaft rotation speed. Specifically, the ECU 300 stores maps TB that indicate relation among the target discharge flow volume and the target line pressure PL of the variable-capacity MOP 201, the MOP shaft rotation speed Nmop, and the target discharge volume of the variable-capacity MOP 201 obtained in advance by experiments or simulation as illustrated in FIG. 7. The ECU 300 then reads the target discharge volume of the variable-capacity MOP 201 corresponding to the target discharge flow volume, the target line pressure PL, and the MOP shaft rotation speed Nmop from the stored maps TB.

In this case, as illustrated in FIG. 5, the ECU 300 preferably calculates a target discharge volume Vmop_tgt_base by using a flow volume Qmop_tgt obtained by adding the amount of oil leakage Q_sol in the solenoid valve 222 corresponding to a control pressure (solenoid control pressure Pact for variable control) of the solenoid valve 222 to the target discharge flow volume (target flow volume used as a basis) Qmop_base calculated in the processing of step S2. The ECU 300 preferably calculates a final target discharge volume Vmop_tgt by setting upper and lower limit values (target discharge volume upper and lower limit guard values) such that the calculated target discharge volume Vmop_tgt_base may fall within a specified control range. Accordingly, the processing of step S3 is completed, and the hydraulic control processing proceeds to step S4.

In the processing of step S4, the ECU 300 calculates a target stroke amount Xstr_tgt of the cam ring 201d of the variable-capacity MOP 201 based on the target discharge volume Vmop_tgt of the variable-capacity MOP 201 calculated in the processing of step S3. Accordingly, the processing of step S4 is completed, and the hydraulic control processing proceeds to step S5.

In the processing of step S5, the ECU 300 calculates a target control hydraulic pressure (solenoid target control pressure for variable control) Pact_tgt of the solenoid valve 222 based on the target stroke amount Xstr_tgt calculated in the processing of step S4. Accordingly, the processing of step S5 is completed, and the hydraulic control processing proceeds to step S6.

In the processing of step S6, the ECU 300 calculates a target rotation speed of the electric motor 215 based on the target discharge flow volume of the EOP 202 calculated in the processing of step S2. Accordingly, the processing of step S6 is completed, and the hydraulic control processing proceeds to step S7.

In the processing of step S7, the ECU 300 controls the solenoid valve 222 and the EOP 202 based on the solenoid target control pressure Pact_tgt for variable control and the target rotation speed of the electric motor 215 calculated in the processing of steps S5 and S6. Specifically, as illustrated in FIG. 5, the ECU 300 calculates a target control current Iact_tgt of the solenoid valve 222 based on the solenoid target control pressure Pact_tgt for variable control, and drives a drive circuit 406 to apply the calculated target control current Iact_tgt to the solenoid valve 222.

Accordingly, the electric current (solenoid output current) Iact is applied to the solenoid valve 222, and the control pressure of the solenoid valve 222 is controlled to be the solenoid control pressure Pact for variable control. As a result, the cam ring 201d performs a stroke corresponding to the stroke amount (cam ring stroke) Xstr, the discharge volume of the variable-capacity MOP 201 is controlled to be the discharge volume Vmop corresponding to the target discharge volume, and the oil of the discharge flow volume Qmop is discharged. As for the EOP 202, when the electric motor 215 drives the EOP 202 at the target rotation speed, the discharge flow volume of the EOP 202 is controlled to be the target discharge flow volume. Accordingly, the processing of step S7 is completed, and a series of the hydraulic control processing steps are terminated. After this point, the hydraulic control processing is repeatedly executed, whenever predetermined time elapses after the hydraulic control processing is ended.

Next, with reference to FIGS. 8 and 9, the discharge flow volume and discharge hydraulic pressure calculation processing in step S2 will be described in detail.

Figure 8:
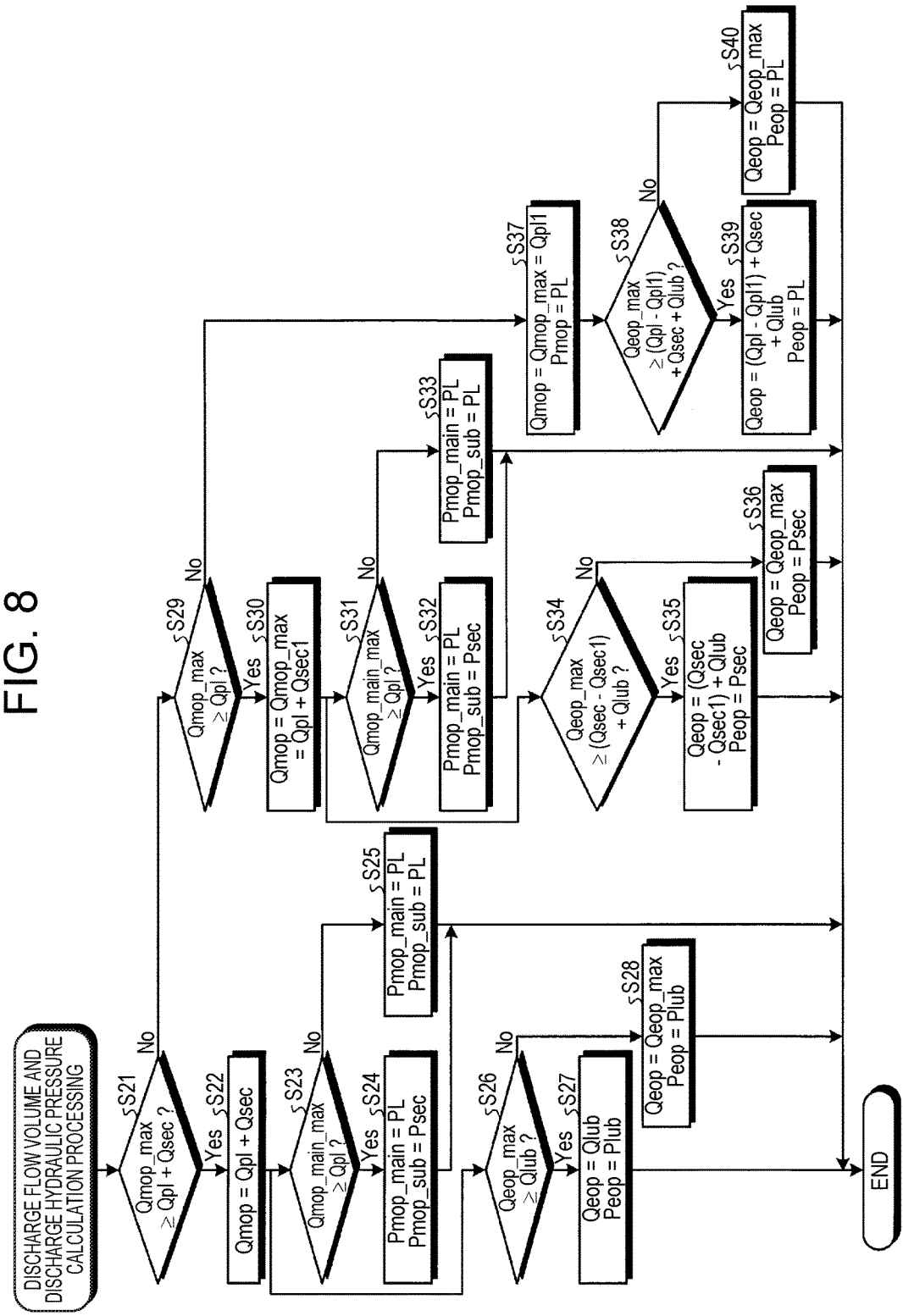
FIG. 8 is a flowchart illustrating the flow of discharge flow volume and discharge hydraulic pressure calculation processing that is a first embodiment of the present disclosure.

The flow of the discharge flow volume and discharge hydraulic pressure calculation processing that is the first embodiment of the present disclosure will be first described as the first embodiment with reference to FIG. 8.

FIG. 8 is a flowchart illustrating the flow of the discharge flow volume and discharge hydraulic pressure calculation processing that is the first embodiment of the present disclosure. The flowchart illustrated in FIG. 8 is started at the timing when the processing of step S1 illustrated in FIG. 4 is completed. Then, the discharge flow volume and discharge hydraulic pressure calculation processing proceeds to step S21.

In the processing of step S21, the ECU 300 determines whether or not a sum of the sheave-clutch control system flow volume $Q_{pl}$ and the T/C control system flow volume $Q_{sec}$ is equal to or less than a discharge flow volume $Q_{mop\_max}$ at the time of maximum discharge volume of the variable-capacity MOP 201. As a result of determination, when the sum of the sheave-clutch control system flow volume $Q_{pl}$ and the T/C control system flow volume $Q_{sec}$ is equal to or less than the discharge flow volume $Q_{mop\_max}$ (step S21: Yes), the ECU 300 advances the discharge flow volume and discharge hydraulic pressure calculation processing to step S22. When the sum of the sheave-clutch control system flow volume $Q_{pl}$ and the T/C control system flow volume $Q_{sec}$ is larger than the discharge flow volume $Q_{mop\_max}$, (Step S21: No), the ECU 300 advances the discharge flow volume and discharge hydraulic pressure calculation processing to step S29.

In the processing of step S22, the ECU 300 sets the target discharge flow volume $Q_{mop}$ of the variable-capacity MOP 201 to the sum of the sheave-clutch control system flow volume $Q_{pl}$ and the T/C control system flow volume $Q_{sec}$. As a consequence, the processing of step S22 is completed, and the discharge flow volume and discharge hydraulic pressure calculation processing proceeds to steps S23 and S26.

In the processing of step S23, the ECU 300 determines whether or not a discharge flow volume $Q_{mop\_main\_max}$ of the main port $Po_1$ at the time of the maximum discharge volume of the variable-capacity MOP 201 is equal to or larger than the sheave-clutch control system flow volume $Q_{pl}$. As a result of determination, when the discharge flow volume $Q_{mop\_main\_max}$ is equal to or larger than the sheave-clutch control system flow volume $Q_{pl}$ (step S23: Yes), the ECU 300 advances the discharge flow volume and discharge hydraulic pressure calculation processing to step S24. When the discharge flow volume $Q_{mop\_main\_max}$ is less than the sheave-clutch control system flow volume $Q_{pl}$ (step S23: No), the ECU 300 advances the discharge flow volume and discharge hydraulic pressure calculation processing to step S25.

In the processing of step S24, the ECU 300 sets a discharge hydraulic pressure $P_{mop\_main}$ of the main port $Po_1$ of the variable-capacity MOP 201 to the target line pressure PL, and sets a discharge hydraulic pressure $P_{mop\_sub}$ of the sub-port $Po_2$ to a secondary pressure $P_{sec}$. As a consequence, the processing of step S24 is completed, and a series of the discharge flow volume and discharge hydraulic pressure calculation processing steps are terminated.

In the processing of step S25, the ECU 300 sets the discharge hydraulic pressures $P_{mop\_main}$, $P_{mop\_sub}$ of the main port $Po_1$ and the sub-port $Po_2$ of the variable-capacity MOP 201 to the target line pressure PL. As a consequence, the processing of step S25 is completed, and a series of the discharge flow volume and discharge hydraulic pressure calculation processing steps are terminated.

In the processing of step S26, the ECU 300 determines whether or not the discharge flow volume $Q_{eop\_max}$ of the EOP 202 at the time of maximum rotation is equal to or larger than the lubrication flow volume $Q_{lub}$. As a result of determination, when the discharge flow volume $Q_{eop\_max}$ is equal to or larger than the lubrication flow volume $Q_{lub}$ (step S26: Yes), the ECU 300 advances the discharge flow volume and discharge hydraulic pressure calculation processing to step S27. When the discharge flow volume $Q_{eop\_max}$ is less than the lubrication flow volume $Q_{lub}$ (step S26: No), the ECU 300 advances the discharge flow volume and discharge hydraulic pressure calculation processing to step S28.

In the processing of step S27, the ECU 300 sets a target discharge flow volume $Q_{eop}$ of the EOP 202 to the lubrication flow volume $Q_{lub}$, and sets a target discharge hydraulic pressure $P_{eop}$ of the EOP 202 to a lubrication pressure $P_{lub}$. As a consequence, the processing of step S27 is completed, and a series of the discharge flow volume and discharge hydraulic pressure calculation processing steps are terminated.

In the processing of step S28, the ECU 300 sets the target discharge flow volume $Q_{eop}$ of the EOP 202 to the discharge flow volume $Q_{eop\_max}$ at the time of the maximum rotation, and sets the target discharge hydraulic pressure $P_{eop}$ of the EOP 202 to the lubrication pressure $P_{lub}$. As a consequence, the processing of step S28 is completed, and a series of the discharge flow volume and discharge hydraulic pressure calculation processing steps are terminated.

In the processing of step S29, the ECU 300 determines whether or not the sheave-clutch control system flow volume $Q_{pl}$ is equal to or less than the discharge flow volume $Q_{mop\_max}$ at the time of the maximum discharge volume of the variable-capacity MOP 201. As a result of determination, when the sheave-clutch control system flow volume $Q_{pl}$ is equal to or less than the discharge flow volume $Q_{mop\_max}$ (step S29: Yes), the ECU 300 advances the discharge flow volume and discharge hydraulic pressure calculation processing to step S30. Meanwhile, when the sheave-clutch control system flow volume $Q_{pl}$ is larger than the discharge flow volume $Q_{mop\_max}$, (step S29: No), the ECU 300 advances the discharge flow volume and discharge hydraulic pressure calculation processing to step S37.

In the processing of step S30, the ECU 300 sets the target discharge flow volume $Q_{mop}$ of the variable-capacity MOP 201 to the discharge flow volume $Q_{mop\_max}$ at the time of the maximum discharge volume, so that the sheave-clutch control system flow volume $Q_{pl}$ and a flow volume $Q_{sec1}$ that is part of the T/C control system flow volume $Q_{sec}$ are supplied from the variable-capacity MOP 201. As a consequence, the processing of step S30 is completed, and the discharge flow volume and discharge hydraulic pressure calculation processing proceeds to steps S31 and S34.

In the processing of step S31, the ECU 300 determines whether or not the discharge flow volume $Q_{mop\_main\_max}$ of the main port $Po_1$ at the time of the maximum discharge volume of the variable-capacity MOP 201 is equal to or larger than the sheave-clutch control system flow volume $Q_{pl}$. As a result of determination, when the discharge flow volume $Q_{mop\_main\_max}$ is equal to or larger than the sheave-clutch control system flow volume $Q_{pl}$ (step S31: Yes), the ECU 300 advances the discharge flow volume and discharge hydraulic pressure calculation processing to step S32. When the discharge flow volume $Q_{mop\_main\_max}$ is less than the sheave-clutch control system flow volume $Q_{pl}$ (step S31: No), the ECU 300 advances the discharge flow volume and discharge hydraulic pressure calculation processing to step S33.

In the processing of step S32, the ECU 300 sets the discharge hydraulic pressure $P_{mop\_main}$ of the main port $Po_1$ of the variable-capacity MOP 201 to the target line pressure PL, and sets the discharge hydraulic pressure $P_{mop\_sub}$ of the sub-port $Po_2$ to the secondary pressure $P_{sec}$. As a consequence, the processing of step S32 is completed, and a series of the discharge flow volume and discharge hydraulic pressure calculation processing steps are terminated.

In the processing of step S33, the ECU 300 sets the discharge hydraulic pressures $P_{mop\_main}$, $P_{mop\_sub}$ of the main port $Po_1$ and the sub-port $Po_2$ of the variable-capacity MOP 201 to the target line pressure PL. As a consequence, the processing of step S33 is completed, and a series of the discharge flow volume and discharge hydraulic pressure calculation processing steps are terminated.

In the processing of step S34, the ECU 300 determines whether or not the discharge flow volume $Q_{eop\_max}$ at the time of the maximum rotation of the EOP 202 is equal to or larger than a sum of a remainder $(Q_{sec}-Q_{sec1})$ of the T/C control system flow volume $Q_{sec}$ that could not be supplied from the variable-capacity MOP 201 and the lubrication flow volume $Q_{lub}$. As a result of determination, when the discharge flow volume $Q_{eop\_max}$ is equal to or larger than the sum of the remainder $(Q_{sec}-Q_{sec1})$ of the T/C control system flow volume $Q_{sec}$ and the lubrication flow volume $Q_{lub}$ (step S34: Yes), the ECU 300 advances the discharge flow volume and discharge hydraulic pressure calculation processing to step S35. When the discharge flow volume $Q_{eop\_max}$ is less than the sum of the remainder $(Q_{sec}-Q_{sec1})$ of the T/C control system flow volume $Q_{sec}$ and the lubrication flow volume $Q_{lub}$ (step S34: No), the ECU 300 advances the discharge flow volume and discharge hydraulic pressure calculation processing to step S36.

In the processing of step S35, the ECU 300 sets the target discharge flow volume $Q_{eop}$ of the EOP 202 to the sum of the remainder $(Q_{sec}-Q_{sec1})$ of the T/C control system flow volume $Q_{sec}$ and the lubrication flow volume $Q_{lub}$, and sets the target discharge hydraulic pressure $P_{eop}$ of the EOP 202 to the secondary pressure $P_{sec}$. As a consequence, the processing of step S35 is completed, and a series of the discharge flow volume and discharge hydraulic pressure calculation processing steps are terminated.

In the processing of step S36, the ECU 300 sets the target discharge flow volume $Q_{eop}$ of the EOP 202 to the discharge flow volume $Q_{eop\_max}$ at the time of the maximum rotation, and sets the target discharge hydraulic pressure $P_{eop}$ of the EOP 202 to the secondary pressure $P_{sec}$. As a consequence, the processing of step S36 is completed, and a series of the discharge flow volume and discharge hydraulic pressure calculation processing steps are terminated.

In the processing of step S37, the ECU 300 sets the target discharge flow volume $Q_{mop}$ of the variable-capacity MOP 201 to the discharge flow volume $Q_{mop\_max}$ at the time of the maximum discharge volume, and sets the target discharge hydraulic pressure $P_{mop}$ of the variable-capacity MOP 201 to the target line pressure PL, so that the flow volume $Q_{pl1}$ that is part of the sheave-clutch control system flow volume $Q_{pl}$ is supplied from the variable-capacity MOP 201. As a consequence, the processing of step S37 is completed, and the discharge flow volume and discharge hydraulic pressure calculation processing proceeds to step S38.

In the processing of step S38, the ECU 300 determines whether or not the discharge flow volume $Q_{eop\_max}$ of the EOP 202 at the time of the maximum rotation is equal to or larger than a sum of a remainder $(Q_{pl}-Q_{pl1})$ of the sheave-clutch control system flow volume $Q_{pl}$ that could not be supplied from the variable-capacity MOP 201, the T/C control system flow volume $Q_{sec}$, and the lubrication flow volume $Q_{lub}$. As a result of determination, when the discharge flow volume $Q_{eop\_max}$ is equal to or larger than the sum of the remainder $(Q_{pl}-Q_{pl1})$ of the sheave-clutch control system flow volume $Q_{pl}$, the T/C control system flow volume $Q_{sec}$, and the lubrication flow volume $Q_{lub}$ (step S38: Yes), the ECU 300 advances the discharge flow volume and discharge hydraulic pressure calculation processing to step S39. When the discharge flow volume $Q_{eop\_max}$ is less than the sum of the remainder $(Q_{pl}-Q_{pl1})$ of the sheave-clutch control system flow volume $Q_{pl}$, the T/C control system flow volume $Q_{sec}$, and the lubrication flow volume $Q_{lub}$ (step S38: No), the ECU 300 advances the discharge flow volume and discharge hydraulic pressure calculation processing to step S40.

In the processing of step S39, the ECU 300 sets the target discharge flow volume $Q_{eop}$ of the EOP 202 to the sum of the remainder $(Q_{pl}-Q_{pl1})$ of the sheave-clutch control system flow volume $Q_{pl}$, the T/C control system flow volume $Q_{sec}$, and the lubrication flow volume $Q_{lub}$, and sets the target discharge hydraulic pressure $P_{eop}$ of the EOP 202 to the target line pressure PL. As a consequence, the processing of step S39 is completed, and a series of the discharge flow volume and discharge hydraulic pressure calculation processing steps are terminated.

In the processing of step S40, the ECU 300 sets the target discharge flow volume $Q_{eop}$ of the EOP 202 to the discharge flow volume $Q_{eop\_max}$ at the time of the maximum rotation, and sets the target discharge hydraulic pressure $P_{eop}$ of the EOP 202 to the target line pressure PL. As a consequence, the processing of step S40 is completed, and a series of the discharge flow volume and discharge hydraulic pressure calculation processing steps are terminated.

Second Embodiment

The flow of the discharge flow volume and discharge hydraulic pressure calculation processing that is the second embodiment of the present disclosure will be described with reference to FIG. 9.

Figure 9:
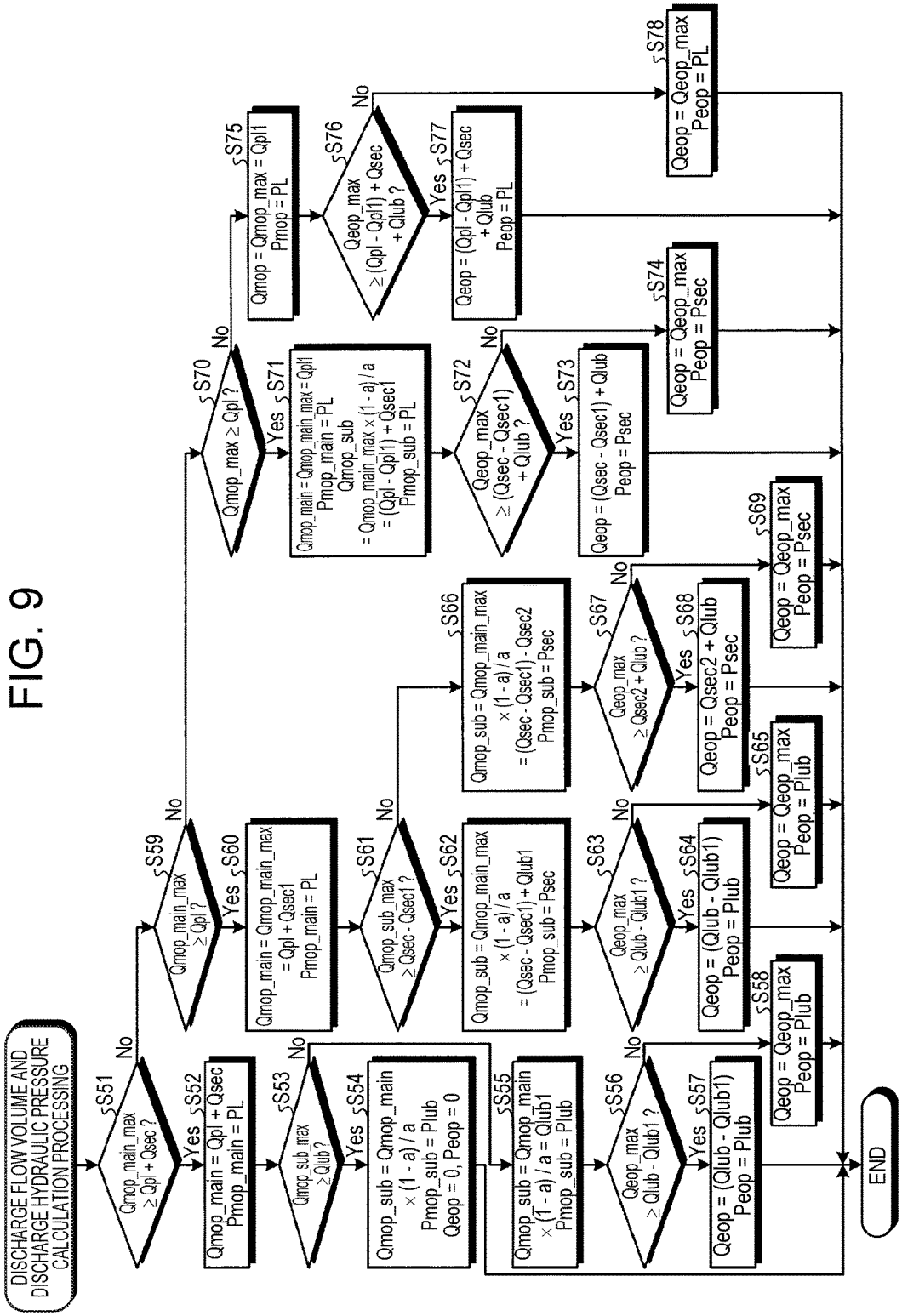
FIG. 9 is a flowchart illustrating the flow of the discharge flow volume and discharge hydraulic pressure calculation processing that is a second embodiment of the present disclosure.

FIG. 9 is a flowchart illustrating the flow of the discharge flow volume and discharge hydraulic pressure calculation processing that is the second embodiment of the present disclosure. The flowchart illustrated in FIG. 9 is started at the timing when the processing of step S1 illustrated in FIG. 4 is completed. Then, the discharge flow volume and discharge hydraulic pressure calculation processing proceeds to step S51.

In the processing of step S51, the ECU 300 determines whether or not the sum of the sheave-clutch control system flow volume $Q_{pl}$ and the T/C control system flow volume $Q_{sec}$ is equal to or less than the discharge flow volume $Q_{mop\_main\_max}$ of the main port $Po_1$ at the time of the maximum discharge volume of the variable-capacity MOP 201. As a result of determination, when the sum of the sheave-clutch control system flow volume $Q_{pl}$ and the T/C control system flow volume $Q_{sec}$ is equal to or less than the discharge flow volume $Q_{mop\_main\_max}$ (step S51: Yes), the ECU 300 advances the discharge flow volume and discharge hydraulic pressure calculation processing to step S52. When the sum of the sheave-clutch control system flow volume $Q_{pl}$ and the T/C control system flow volume $Q_{sec}$ is larger than the discharge flow volume $Q_{mop\_main\_max}$ (Step S51: No), the ECU 300 advances the discharge flow volume and discharge hydraulic pressure calculation processing to step S59.

In the processing of step S52, the ECU 300 sets a target discharge flow volume $Q_{mop\_main}$ of the variable-capacity MOP 201 to the sum of the sheave-clutch control system flow volume $Q_{pl}$ and the T/C control system flow volume $Q_{sec}$. The ECU 300 also sets the discharge hydraulic pressure $P_{mop\_main}$ of the main port $Po_1$ of the variable-capacity MOP 201 to the target line pressure PL. As a consequence, the processing of step S52 is completed, and the discharge flow volume and discharge hydraulic pressure calculation processing proceeds to step S53.

In the processing of step S53, the ECU 300 determines whether or not the lubrication flow volume $Q_{lub}$ is equal to or less than a discharge flow volume $Q_{mop\_sub\_max}$ of the sub-port $Po_2$ at the time of the maximum discharge volume of the variable-capacity MOP 201. As a result of determination, when the lubrication flow volume $Q_{lub}$ is equal to or less than the discharge flow volume $Q_{mop\_sub\_max}$ (step S53: Yes), the ECU 300 advances the discharge flow volume and discharge hydraulic pressure calculation processing to step S54. Meanwhile, when the lubrication flow volume $Q_{lub}$ is larger than the discharge flow volume $Q_{mop\_sub\_max}$, (step S53: No), the ECU 300 advances the discharge flow volume and discharge hydraulic pressure calculation processing to step S55.

In the processing of step S54, the ECU 300 sets as the target discharge flow volume $Q_{mop\_sub}$ of the sub-port $Po_2$ of the variable-capacity MOP 201 a value obtained by multiplying the target discharge flow volume $Q_{mop\_main}$ of the main port $Po_1$ of the variable-capacity MOP 201 by a port ratio (1−a)/a (main port: sub-port=a: 1−a). The ECU 300 sets the target discharge hydraulic pressure $P_{mop\_sub}$ of the sub-port $Po_2$ of the variable-capacity MOP 201 to the lubrication pressure $P_{lub}$. The ECU 300 further sets both the target discharge flow volume $Q_{eop}$ and the target discharge hydraulic pressure $P_{eop}$ of the EOP 202 to zero. As a consequence, the processing of step S54 is completed, and a series of the discharge flow volume and discharge hydraulic pressure calculation processing steps are terminated.

In the processing of step S55, the ECU 300 sets as the target discharge flow volume $Q_{mop\_sub}$ of the sub-port $Po_2$ of the variable-capacity MOP 201 the value obtained by multiplying the target discharge flow volume $Q_{mop\_main}$ of the main port $Po_1$ of the variable-capacity MOP 201 by the port ratio (1−a)/a, so that the flow volume $Q_{lub1}$ that is part of the lubrication flow volume $Q_{lub}$ is supplied from the sub-port $Po_2$ of the variable-capacity MOP 201. The ECU 300 also sets the target discharge hydraulic pressure $P_{mop\_sub}$ of the sub-port $Po_2$ of the variable-capacity MOP 201 to the lubrication pressure $P_{lub}$. As a consequence, the processing of step S55 is completed, and the discharge flow volume and discharge hydraulic pressure calculation processing proceeds to step S56.

In the processing of step S56, the ECU 300 determines whether or not the discharge flow volume $Q_{eop\_max}$ at the time of the maximum rotation of the EOP 202 is equal to or larger than a remainder $(Q_{lub}-Q_{lub1})$ of the lubrication flow volume $Q_{lub}$ which could not be supplied from the sub-port $Po_2$ of the variable-capacity MOP 201. As a result of determination, when the discharge flow volume $Q_{eop\_max}$ is equal to or larger than the remainder $(Q_{lub}-Q_{lub1})$ of the lubrication flow volume $Q_{lub}$ (step S56: Yes), the ECU 300 advances the discharge flow volume and discharge hydraulic pressure calculation processing to step S57. When the discharge flow volume $Q_{eop\_max}$ is less than the remainder $(Q_{lub}-Q_{lub1})$ of the lubrication flow volume $Q_{lub}$, (Step S56: No), the ECU 300 advances the discharge flow volume and discharge hydraulic pressure calculation processing to step S58.

In the processing of step S57, the ECU 300 sets the target discharge flow volume $Q_{eop}$ of the EOP 202 to the remainder $(Q_{lub}-Q_{lub1})$ of the lubrication flow volume $Q_{lub}$, and sets the target discharge hydraulic pressure $P_{eop}$ of the EOP 202 to the lubrication pressure $P_{lub}$. As a consequence, the processing of step S57 is completed, and a series of the discharge flow volume and discharge hydraulic pressure calculation processing steps are terminated.

In the processing of step S58, the ECU 300 sets the target discharge flow volume $Q_{eop}$ of the EOP 202 to the discharge flow volume $Q_{eop\_max}$ at the time of the maximum rotation, and sets the target discharge hydraulic pressure $P_{eop}$ of the EOP 202 to the lubrication pressure $P_{lub}$. As a consequence, the processing of step S58 is completed, and a series of the discharge flow volume and discharge hydraulic pressure calculation processing steps are terminated.

In the processing of step S59, the ECU 300 determines whether or not the sheave-clutch control system flow volume $Q_{pl}$ is equal to or less than the discharge flow volume $Q_{mop\_main\_max}$ of the main port $Po_1$ at the time of the maximum discharge volume of the variable-capacity MOP 201. As a result of determination, when the sheave-clutch control system flow volume $Q_{pl}$ is equal to or less than the discharge flow volume $Q_{mop\_main\_max}$, (step S59: Yes), the ECU 300 advances the discharge flow volume and discharge hydraulic pressure calculation processing to step S60. Meanwhile, when the sheave-clutch control system flow volume $Q_{pl}$ is larger than the discharge flow volume $Q_{mop\_main\_max}$, (step S59: No), the ECU 300 advances the discharge flow volume and discharge hydraulic pressure calculation processing to step S70.

In the processing of step S60, the ECU 300 sets the target discharge flow volume $Q_{mop\_main}$ of the main port $Po_1$ of the variable-capacity MOP 201 to the discharge flow volume $Q_{mop\_main\_max}$ of the main port $Po_1$ at the time of the maximum discharge volume, so that the sheave-clutch control system flow volume $Q_{pl}$ and the flow volume $Q_{sec1}$ that is part of the T/C control system flow volume $Q_{sec}$ are supplied from the main port $Po_1$ of the variable-capacity MOP 201. The ECU 300 also sets the discharge hydraulic pressure $P_{mop\_main}$ of the main port $Po_1$ of the variable-capacity MOP 201 to the target line pressure PL. As a consequence, the processing of step S60 is completed, and the discharge flow volume and discharge hydraulic pressure calculation processing proceeds to step S61.

In the processing of step S61, the ECU 300 determines whether or not a remainder $(Q_{sec}-Q_{sec1})$ of the T/C control-system flow volume $Q_{sec}$ which could not be supplied from the main port $Po_1$ of the variable-capacity MOP 201 is equal to or less than the discharge flow volume $Q_{mop\_sub\_max}$ of the sub-port $Po_2$ at the time of the maximum discharge volume of the variable-capacity MOP 201. When the remainder $(Q_{sec}-Q_{sec1})$ is equal to or less than the discharge flow volume $Q_{mop\_sub\_max}$ as a result of determination (step S61: Yes), the ECU 300 advances the discharge flow volume and discharge hydraulic pressure calculation processing to step S62. Meanwhile, when the remainder $(Q_{sec}-Q_{sec1})$ is larger than the discharge flow volume $Q_{mop\_sub\_max}$, (step S61: No), the ECU 300 advances the discharge flow volume and discharge hydraulic pressure calculation processing to step S66.

In the processing of step S62, the ECU 300 sets as the target discharge flow volume $Q_{mop\_sub}$ of the sub-port $Po_2$ of the variable-capacity MOP 201 a value obtained by multiplying the discharge flow volume $Q_{mop\_main\_max}$ of the main port $Po_1$ at the maximum discharge volume of the variable-capacity MOP 201 by the port ratio (1-a)/a, so that the remainder $(Q_{sec}-Q_{sec1})$ of the T/C control-system flow volume $Q_{sec}$ and the flow volume $Q_{lub1}$ that is part of the lubrication flow volume $Q_{lub}$ are supplied from the sub-port $Po_2$ of the variable-capacity MOP 201. The ECU 300 also sets the target discharge hydraulic pressure $P_{mop\_sub}$ of the sub-port $Po_2$ of the variable-capacity MOP 201 to the secondary pressure $P_{sec}$. As a consequence, the processing of step S62 is completed, and the discharge flow volume and discharge hydraulic pressure calculation processing proceeds to step S63.

In the processing of step S63, the ECU 300 determines whether or not the discharge flow volume $Q_{eop\_max}$ at the time of the maximum rotation of the EOP 202 is equal to or larger than the remainder $(Q_{lub}-Q_{lub1})$ of the lubrication flow volume $Q_{lub}$ which could not be supplied from the sub-port $Po_2$ of the variable-capacity MOP 201. As a result of determination, when the discharge flow volume $Q_{eop\_max}$ is equal to or larger than the remainder $(Q_{lub}-Q_{lub1})$ of the lubrication flow volume $Q_{lub}$ (step S63: Yes), the ECU 300 advances the discharge flow volume and discharge hydraulic pressure calculation processing to step S64. When the discharge flow volume $Q_{eop\_max}$ is less than the remainder $(Q_{lub}-Q_{lub1})$ of the lubrication flow volume $Q_{lub}$, (step S63: No), the ECU 300 advances the discharge flow volume and discharge hydraulic pressure calculation processing to step S65.

In the processing of step S64, the ECU 300 sets the target discharge flow volume $Q_{eop}$ of the EOP 202 to the remainder $(Q_{lub}-Q_{lub1})$ of the lubrication flow volume $Q_{lub}$, and sets the target discharge hydraulic pressure $P_{eop}$ of the EOP 202 to the lubrication pressure $P_{lub}$. As a consequence, the processing of step S64 is completed, and a series of the discharge flow volume and discharge hydraulic pressure calculation processing steps are terminated.

In the processing of step S65, the ECU 300 sets the target discharge flow volume $Q_{eop}$ of the EOP 202 to the discharge flow volume $Q_{eop\_max}$ at the time of the maximum rotation, and sets the target discharge hydraulic pressure $P_{eop}$ of the EOP 202 to the lubrication pressure $P_{lub}$. As a consequence, the processing of step S65 is completed, and a series of the discharge flow volume and discharge hydraulic pressure calculation processing steps are terminated.

In the processing of step S66, the ECU 300 sets as the target discharge flow volume $Q_{mop\_sub}$ of the sub-port $Po_2$ of the variable-capacity MOP 201 the value obtained by multiplying the discharge flow volume $Q_{mop\_main\_max}$ of the main port $Po_1$ at the time of the maximum discharge volume of the variable-capacity MOP 201 by the port ratio (1-a)/a, so that a flow volume $(Q_{sec}-Q_{sec1})-Q_{sec2}$ obtained by subtracting a flow volume $Q_{sec2}$ from the remainder $(Q_{sec}-Q_{sec1})$ of the T/C control-system flow volume $Q_{sec}$ is supplied from the sub-port $Po_2$ of the variable-capacity MOP 201. The ECU 300 also sets the target discharge hydraulic pressure $P_{mop\_sub}$ of the sub-port $Po_2$ of the variable-capacity MOP 201 to the secondary pressure $P_{sec}$. As a consequence, the processing of step S66 is completed, and the discharge flow volume and discharge hydraulic pressure calculation processing proceeds to step S67.

In the processing of step S67, the ECU 300 determines whether or not the discharge flow volume $Q_{eop\_max}$ of the EOP 202 at the time of maximum rotation is equal to or larger than a sum of the flow volume $Q_{sec2}$ and the lubrication flow volume $Q_{lub}$. As a result of determination, when the discharge flow volume $Q_{eop\_max}$ is equal to or larger than the sum of the flow volume $Q_{sec2}$ and the lubrication flow volume $Q_{lub}$ (step S67: Yes), the ECU 300 advances the discharge flow volume and discharge hydraulic pressure calculation processing to step S68. When the discharge flow volume $Q_{eop\_max}$ is less than the sum of the flow volume $Q_{sec2}$ and the lubrication flow volume $Q_{lub}$ (step S67: No), the ECU 300 advances the discharge flow volume and discharge hydraulic pressure calculation processing to step S69.

In the processing of step S68, the ECU 300 sets the target discharge flow volume $Q_{eop}$ of the EOP 202 to the sum of the flow volume $Q_{sec2}$ and the lubrication flow volume $Q_{lub}$, and sets the target discharge hydraulic pressure $P_{eop}$ of the EOP 202 to the secondary pressure $P_{sec}$. As a consequence, the processing of step S68 is completed, and a series of the discharge flow volume and discharge hydraulic pressure calculation processing steps are terminated.

In the processing of step S69, the ECU 300 sets the target discharge flow volume $Q_{eop}$ of the EOP 202 to the discharge flow volume $Q_{eop\_max}$ at the time of the maximum rotation, and sets the target discharge hydraulic pressure $P_{eop}$ of the EOP 202 to the secondary pressure $P_{sec}$. As a consequence, the processing of step S69 is completed, and a series of the discharge flow volume and discharge hydraulic pressure calculation processing steps are terminated.

In the processing of step S70, the ECU 300 determines whether or not the sheave-clutch control system flow volume $Q_{pl}$ is equal to or less than the discharge flow volume $Q_{mop\_max}$ at the time of the maximum discharge volume of the variable-capacity MOP 201. As a result of determination, when the sheave-clutch control system flow volume $Q_{pl}$ is equal to or less than the discharge flow volume $Q_{mop\_max}$ (step S70: Yes), the ECU 300 advances the discharge flow volume and discharge hydraulic pressure calculation processing to step S71. Meanwhile, when the sheave-clutch control system flow volume $Q_{pl}$ is larger than the discharge flow volume $Q_{mop\_max}$ (step S70: No), the ECU 300 advances the discharge flow volume and discharge hydraulic pressure calculation processing to step S75.

In the processing of step S71, the ECU 300 sets the target discharge flow volume $Q_{mop\_main}$ of the main port $Po_1$ of the variable-capacity MOP 201 to the discharge flow volume $Q_{mop\_main\_max}$ of the main port $Po_1$ at the time of the maximum discharge volume of the variable-capacity MOP 201, so that the flow volume $Q_{pl1}$ that is part of the sheave-clutch control system flow volume $Q_{pl}$ is supplied from the main port $Po_1$ of the variable-capacity MOP 201. The ECU 300 also sets the target discharge hydraulic pressure $P_{mop\_main}$ of the main port $Po_1$ of the variable-capacity MOP 201 to the target line pressure PL. The ECU 300 further sets the target discharge flow volume $Q_{mop\_sub}$ of the sub-port $Po_2$ of the variable-capacity MOP 201 to a value obtained by multiplying the discharge flow volume $Q_{mop\_main\_max}$ of the main port $Po_1$ at the time of the maximum discharge volume of the variable-capacity MOP 201 by the port ratio (1-a)/a, so that a sum of the remainder $(Q_{pl}-Q_{pl1})$ of the sheave-clutch control system flow volume $Q_{pl}$ and the flow volume $Q_{sec1}$ that is part of the T/C control system flow volume $Q_{sec}$ is supplied from the sub-port $Po_2$ of the variable-capacity MOP 201. The ECU 300 also sets the target discharge hydraulic pressure $P_{mop\_sub}$ of the sub-port $Po_2$ of the variable-capacity MOP 201 to the target line pressure PL. As a consequence, the processing of step S71 is completed, and the discharge flow volume and discharge hydraulic pressure calculation processing proceeds to step S72.

In the processing of step S72, the ECU 300 determines whether or not the discharge flow volume $Q_{eop\_max}$ at the time of the maximum rotation of the EOP 202 is equal to or larger than the sum of the remainder $(Q_{sec}-Q_{sec1})$ of the T/C control system flow volume $Q_{sec}$ that could not be supplied from the sub-port $Po_2$ of the variable-capacity MOP 201 and the lubrication flow volume $Q_{lub}$. As a result of determination, when the discharge flow volume $Q_{eop\_max}$ is equal to or larger than the sum of the remainder $(Q_{sec}-Q_{sec1})$ and the lubrication flow volume $Q_{lub}$ (step S72: Yes), the ECU 300 advances the discharge flow volume and discharge hydraulic pressure calculation processing to step S73. When the discharge flow volume $Q_{eop\_max}$ is less than the sum of the remainder $(Q_{sec}-Q_{sec1})$ and the lubrication flow volume $Q_{lub}$ (step S72: No), the ECU 300 advances the discharge flow volume and discharge hydraulic pressure calculation processing to step S74.

In the processing of step S73, the ECU 300 sets the target discharge flow volume $Q_{eop}$ of the EOP 202 to the sum of the remainder $(Q_{sec}-Q_{sec1})$ of the T/C control system flow volume $Q_{sec}$ and the lubrication flow volume $Q_{lub}$, and sets the target discharge hydraulic pressure $P_{eop}$ of the EOP 202 to the secondary pressure $P_{sec}$. As a consequence, the processing of step S73 is completed, and a series of the discharge flow volume and discharge hydraulic pressure calculation processing steps are terminated.

In the processing of step S74, the ECU 300 sets the target discharge flow volume $Q_{eop}$ of the EOP 202 to the discharge flow volume $Q_{eop\_max}$ at the time of the maximum rotation of the EOP 202, and sets the target discharge hydraulic pressure $P_{eop}$ of the EOP 202 to the secondary pressure $P_{sec}$. As a consequence, the processing of step S74 is completed, and a series of the discharge flow volume and discharge hydraulic pressure calculation processing steps are terminated.

In the processing of step S75, the ECU 300 sets the target discharge flow volume $Q_{mop}$ of the variable-capacity MOP 201 to the discharge flow volume $Q_{mop\_max}$ at the time of the maximum discharge volume, and sets the target discharge hydraulic pressure $P_{mop}$ of the variable-capacity MOP 201 to the target line pressure PL, so that the flow volume $Q_{pl1}$ that is part of the sheave-clutch control system flow volume $Q_{pl}$ is supplied from the variable-capacity MOP 201. As a consequence, the processing of step S75 is completed, and the discharge flow volume and discharge hydraulic pressure calculation processing proceeds to step S76.

In the processing of step S76, the ECU 300 determines whether or not the discharge flow volume $Q_{eop\_max}$ of the EOP 202 at the time of the maximum rotation is equal to or larger than a sum of a remainder ($Q_{pl}-Q_{pl1}$) of the sheave-clutch control system flow volume $Q_{pl}$ that could not be supplied from the variable-capacity MOP 201, the T/C control system flow volume $Q_{sec}$, and the lubrication flow volume $Q_{lub}$. As a result of determination, when the discharge flow volume $Q_{eop\_max}$ is equal to or larger than the sum of the remainder ($Q_{pl}-Q_{pl1}$) of the sheave-clutch control system flow volume $Q_{pl}$, the T/C control system flow volume $Q_{sec}$, and the lubrication flow volume $Q_{lub}$ (step S76: Yes), the ECU 300 advances the discharge flow volume and discharge hydraulic pressure calculation processing to step S77. When the discharge flow volume $Q_{eop\_max}$ is less than the sum of the remainder ($Q_{pl}-Q_{pl1}$) of the sheave-clutch control system flow volume $Q_{pl}$, the T/C control system flow volume $Q_{sec}$, and the lubrication flow volume $Q_{lub}$ (step S76: No), the ECU 300 advances the discharge flow volume and discharge hydraulic pressure calculation processing to step S78.

In the processing of step S77, the ECU 300 sets the target discharge flow volume $Q_{eop}$ of the EOP 202 to the sum of the remainder ($Q_{pl}-Q_{pl1}$) of the sheave-clutch control system flow volume $Q_{pl}$, the T/C control system flow volume $Q_{sec}$, and the lubrication flow volume $Q_{lub}$, and sets the target discharge hydraulic pressure $P_{eop}$ of the EOP 202 to the target line pressure PL. As a consequence, the processing of step S77 is completed, and a series of the discharge flow volume and discharge hydraulic pressure calculation processing steps are terminated.

In the processing of step S78, the ECU 300 sets the target discharge flow volume $Q_{eop}$ of the EOP 202 to the discharge flow volume $Q_{eop\_max}$ at the time of the maximum rotation of the EOP 202, and sets the target discharge hydraulic pressure $P_{eop}$ of the EOP 202 to the target line pressure PL. As a consequence, the processing of step S78 is completed, and a series of the discharge flow volume and discharge hydraulic pressure calculation processing steps are terminated.

As is clear from the above description, in the vehicular hydraulic control device as one embodiment of the present disclosure, the ECU 300 calculates the target discharge volume of the variable-capacity MOP 201 using the target line pressure of the hydraulic circuit 200, the target discharge flow volume of the variable-capacity MOP 201, and the MOP shaft rotation speed calculated from the input shaft rotation speed, and controls the variable-capacity MOP 201 based on the calculated target discharge volume. Accordingly, the variable-capacity MOP 201 can be controlled with sufficient responsiveness, without using the measuring device for an actual discharge hydraulic pressure.

Figure 10:
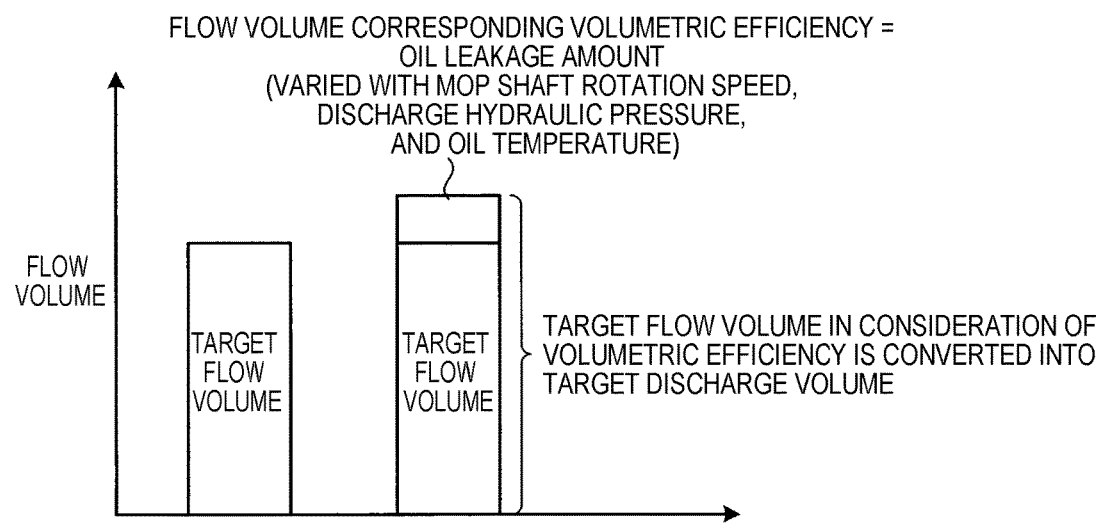
FIG. 10 is an explanatory view illustrating a modification of the hydraulic control processing that is one embodiment of the present disclosure.

In a first modification, when the target discharge volume of the variable-capacity MOP 201 is calculated, it is preferable to set the target discharge volume of the variable-capacity MOP 201 larger as the volumetric efficiency of the variable-capacity MOP 201 becomes lower. Specifically, the amount of oil leakage from the variable-capacity MOP 201 varies with the MOP shaft rotation speed, the discharge hydraulic pressure, and the oil temperature. As the amount of oil leakage increases, the actual discharge hydraulic pressure of the variable-capacity MOP 201 falls below the target discharge hydraulic pressure. Accordingly, as illustrated in FIG. 10, at the time of calculating the target discharge volume of the variable-capacity MOP 201, the ECU 300 reads a volumetric efficiency corresponding to the target line pressure, the MOP shaft rotation speed, and the discharge volume from the maps indicating the relation among the target line pressure, the MOP shaft rotation speed, and the volumetric efficiency of the variable-capacity MOP 201 for each discharge volume of the variable-capacity MOP 201. It is preferable that the ECU 300 calculates a target flow volume of the variable-capacity MOP 201 by adding to the target flow volume a flow volume corresponding to the read volumetric efficiency, and calculates the target discharge volume of the variable-capacity MOP 201 using the calculated target flow volume.

Accordingly, the target discharge volume of the variable-capacity MOP 201 is set larger as the volumetric efficiency becomes lower. As a result, even in the case where the amount of oil leakage from the variable-capacity MOP 201 increases, the variable-capacity MOP 201 can be controlled with sufficient responsiveness as compared with the case of measuring the actual discharge hydraulic pressure and performing feedback control. Since the volumetric efficiency varies in accordance with the discharge volume of the variable-capacity MOP 201, convergence calculation is needed when the volumetric efficiency is calculated. When the convergence calculation is difficult, the volumetric efficiency may be calculated using maps indicating the relation among the target discharge flow volume and the target discharge hydraulic pressure of the variable-capacity MOP 201, the MOP shaft rotation speed, and the volumetric efficiency. When the variable-capacity MOP 201 is of a dual port type, it is preferable to take into consideration a variation of the volumetric efficiency caused by the discharge pressure of the sub-port.

In a second modification, when the EOP 202 is driven at an operating point more sufficient than a current operating point, and a decrease amount of fuel consumption of the engine 1 caused by decrease in the discharge flow volume of the variable-capacity MOP 201 is larger than the fuel consumption corresponding to an increment of the driving electric power amount of the EOP 202, it is preferable that the ECU 300 drives the EOP 202 at the operating point more efficient than the current operating point and executes discharge flow volume control processing to decrease the discharge flow volume of the variable-capacity MOP 201. The discharge flow volume control processing will be described in detail below with reference to FIGS. 11 and 12.

Figure 11:
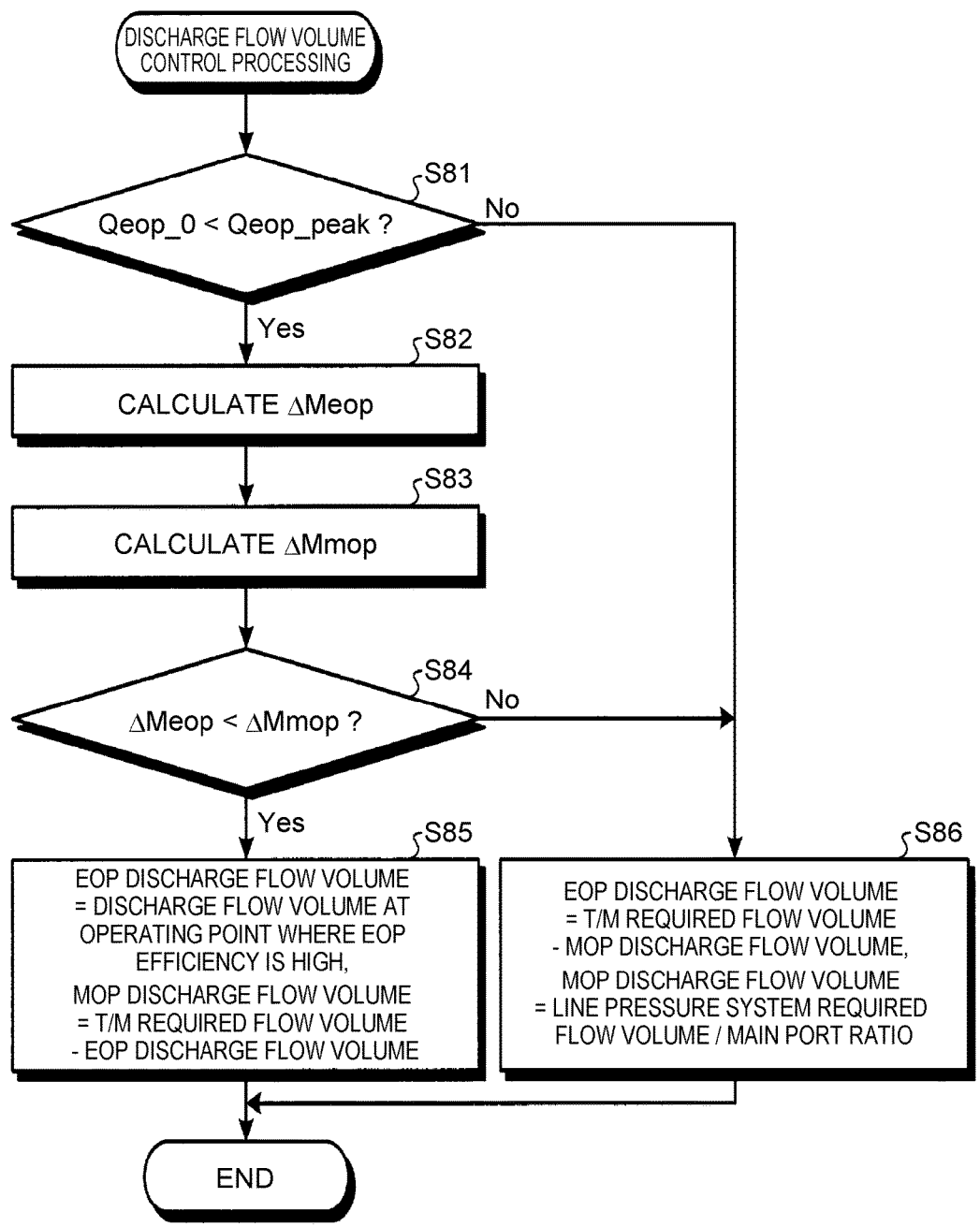
FIG. 11 is a flowchart illustrating the flow of discharge flow volume control processing that is one embodiment of the present disclosure.
Figure 12:
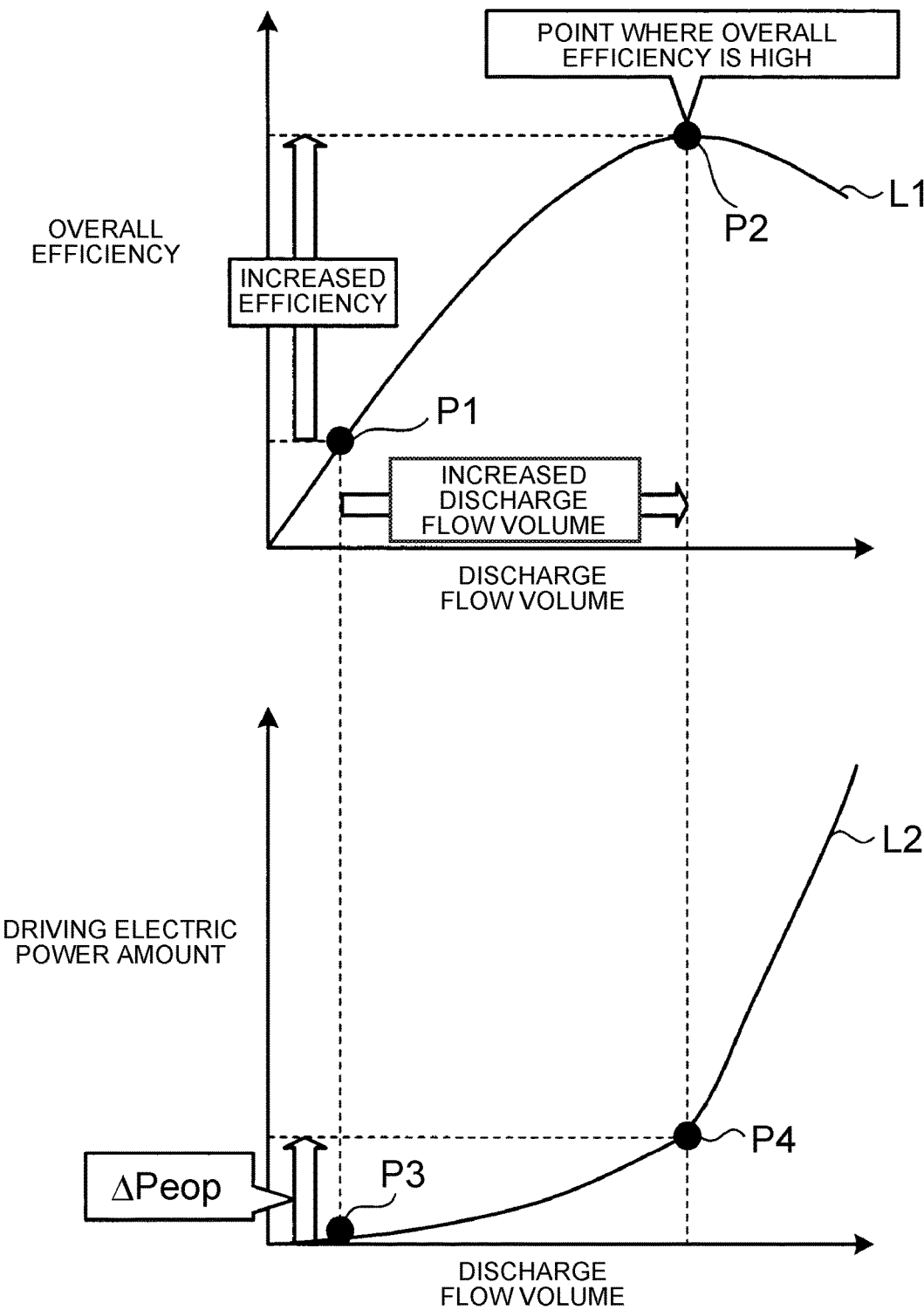
FIG. 12 is an explanatory view illustrating the discharge flow volume control processing that is one embodiment of the present disclosure.

FIG. 11 is a flowchart illustrating the flow of the discharge flow volume control processing that is one embodiment of the present disclosure. FIG. 12 is an explanatory view illustrating the discharge flow volume control processing that is one embodiment of the present disclosure. The flowchart illustrated in FIG. 11 starts at the timing when the ignition switch of the vehicle Ve is switched from an OFF state to an ON state. Then, the discharge flow volume control processing proceeds to step S81.

In the processing of step S81, the ECU 300 compares size relation between a discharge flow volume $Q_{eop\_0}$ of the EOP 202 at a current operating point and a discharge flow volume $Q_{eop\_peak}$ of the EOP 202 at an operating point where the overall efficiency is the highest. As a result of comparison, when the discharge flow volume $Q_{eop\_0}$ is smaller than the discharge flow volume $Q_{eop\_peak}$ (step S81: Yes), the ECU 300 advances the discharge flow volume control processing to step S82. Specifically, as illustrated in an upper graph of FIG. 12, the ECU 300 advances the discharge flow volume control processing to step S82, when the discharge flow volume $Q_{eop\_0}$ of the EOP 202 at the current operating point P1 is smaller than the discharge flow volume $Q_{eop\_peak}$ of the EOP 202 at the operating point P2 where the overall efficiency of the EOP 202 is the highest. In the upper graph of FIG. 12, a curve L1 is a curve depicting the relation between the overall efficiency and the discharge flow volume of the EOP 202. When the discharge flow volume $Q_{eop\_0}$ is equal to or larger than the discharge flow volume $Q_{eop\_peak}$, (step S81: No), the ECU 300 advances the discharge flow volume control processing to S86.

In the processing of step S82, as illustrated in a lower graph of FIG. 12, the ECU 300 calculates a fuel consumption increment ΔMeop generated by increase (increase amount $\Delta P_{eop}$) in the driving electric power amount of the EOP 202 caused by moving the operating point of the EOP 202 from the current operating point P3 to an operating point P4 where the overall efficiency is the highest. In the lower graph of FIG. 12, a curve L2 is a curve depicting the relation between the driving electric power amount and the discharge flow volume of the EOP 202. Accordingly, the control processing of step S82 is completed, and the discharge flow volume processing proceeds to step S83.

In the processing of step S83, the ECU 300 calculates a fuel consumption decrement ΔMmop due to enhanced transmission efficiency of the variable-capacity MOP 201 caused by the increase in the discharge flow volume of the EOP 202. Accordingly, the control processing of step S83 is completed, and the discharge flow volume control processing proceeds to step S84.

In the processing of step S84, the ECU 300 determines whether or not the fuel consumption increment ΔMeop calculated in the processing of step S82 is smaller than the fuel consumption decrement ΔMmop calculated in the processing of step S83. As a result of determination, when the fuel consumption increment ΔMeop is smaller than the fuel consumption decrement ΔMmop (step S84: Yes), the ECU 300 advances the discharge flow volume control processing to step S85. When the fuel consumption increment ΔMeop is equal to or larger than the fuel consumption decrement ΔMmop, (step S84: No), the ECU 300 advances the discharge flow volume control processing to step S86.

In the processing of step S85, the ECU 300 sets the discharge flow volume of the EOP 202 to a discharge flow volume at the operating point where the overall efficiency is the highest. The ECU 300 also sets a value obtained by subtracting the discharge flow volume of the EOP 202 from the T/M required flow volume as the discharge flow volume of the variable-capacity MOP 201. Accordingly, the control processing of step S85 is completed, and a series of the discharge flow volume control processing steps are terminated. After this point, the ECU 300 repeatedly executes the discharge flow volume control processing, whenever predetermined time elapses after the discharge flow volume control processing is ended.

In the processing of step S86, the ECU 300 sets a value obtained by dividing the flow volume of oil required for the line pressure system in the hydraulic circuit 200 by the main port ratio of the variable-capacity MOP 201 as the discharge flow volume of the variable-capacity MOP 201. The ECU 300 also sets a value obtained by subtracting the discharge flow volume of the variable-capacity MOP 201 from the T/M required flow volume as the discharge flow volume of the EOP 202. Accordingly, the control processing of step S86 is completed, and a series of the discharge flow volume control processing steps are terminated. After this point, the ECU 300 repeatedly executes the discharge flow volume control processing, whenever predetermined time elapses after the discharge flow volume control processing is ended.

Figure 13:
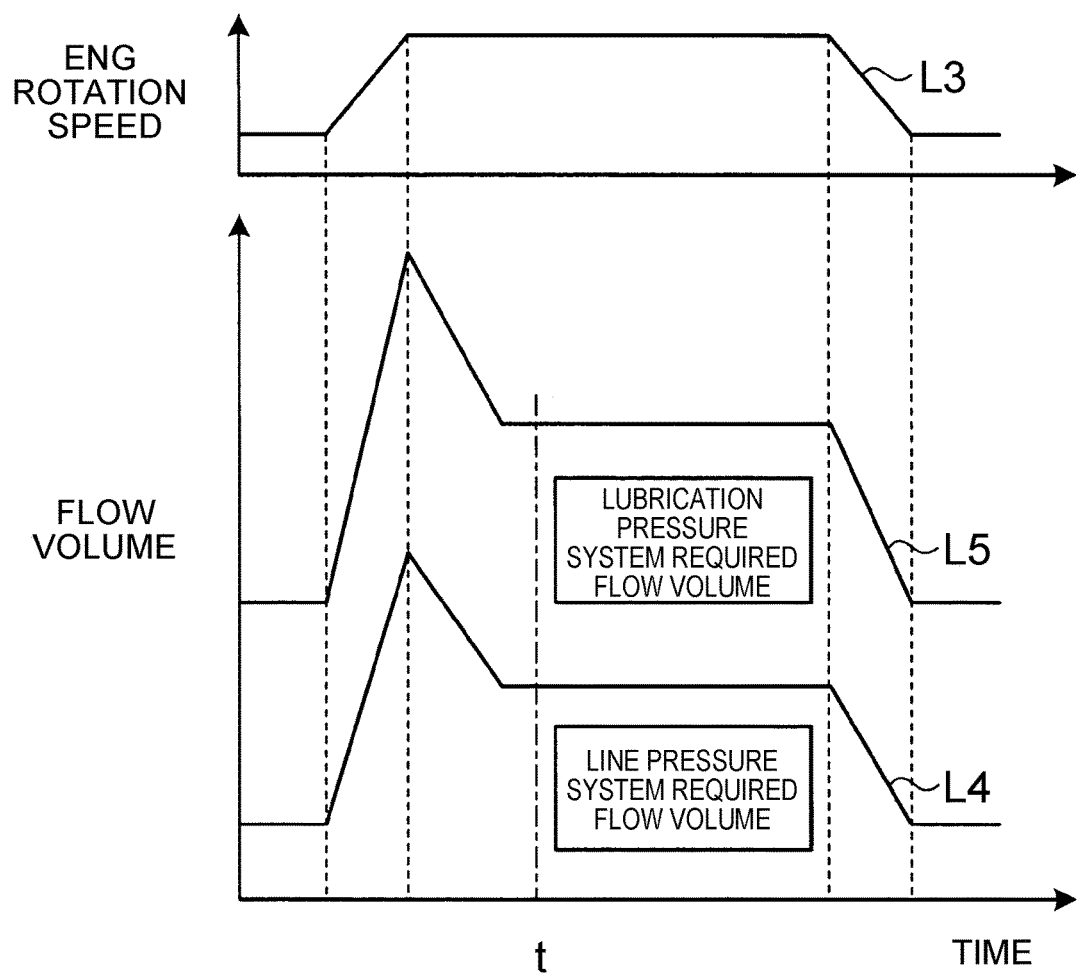
FIG. 13 illustrates one example of temporal change in a required flow volume for a line pressure system and a required flow volume for a lubrication pressure system versus temporal change in engine rotation speed.
Figure 14:
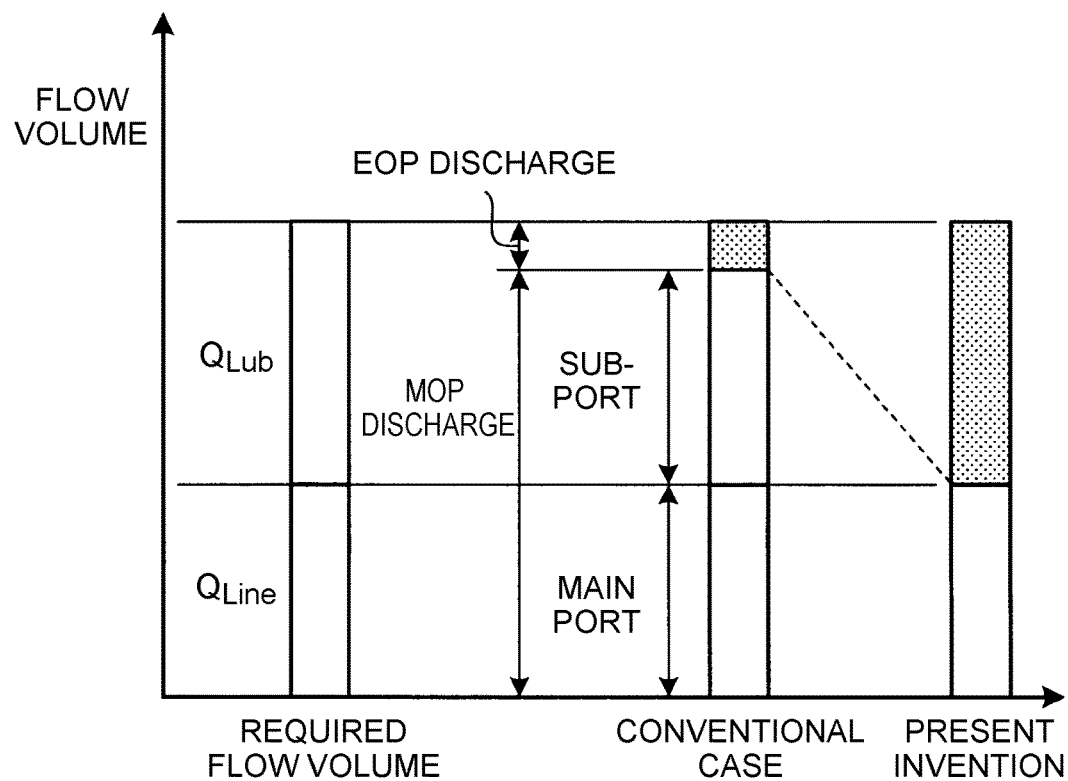
FIG. 14 illustrates discharge flow quantities of the variable-capacity MOP and EOP in the discharge flow volume control processing in a conventional example and in the present disclosure.

A description is now given of the effect of the discharge flow volume control processing with reference to FIGS. 13 and 14. FIG. 13 illustrates one example of temporal change in the required flow volume for the line pressure system and the required flow volume for the lubrication pressure system versus temporal change in engine rotation speed. FIG. 14 illustrates discharge flow quantities of the variable-capacity MOP 201 and the EOP 202 in the discharge flow volume control processing in a conventional example and in the present disclosure.

Consider the case where the required flow quantities for the line pressure system and the lubrication pressure system change in accordance with change in engine rotation speed as illustrated in upper and lower graphs of FIG. 13. In the upper and lower graphs of FIG. 13, a line L3 represents the engine rotation speed, a line L4 represents the required flow volume for the line pressure system, and a line L5 represents the required flow volume for the lubrication pressure system. In this case, in conventional discharge flow volume control processing, at time t illustrated in FIG. 13, the variable-capacity MOP 201 (main port and sub-port) is used to supply a required flow volume $Q_{Line}$ for the line pressure system and part of a required flow volume $Q_{Lub}$ for the lubrication pressure system, while the EOP 202 is used to supply a portion of the required flow volume for the lubrication pressure system that is not sufficiently supplied from the variable-capacity MOP 201 as illustrated in FIG. 14. That is, the EOP 202 discharges the amount of oil not sufficiently supplied from the variable-capacity MOP 201. Accordingly, the variable-capacity MOP 201 operates in a region of a low discharge flow volume and poor efficiency.

On the contrary, in the discharge flow volume control processing that is one embodiment of the present disclosure, when the fuel consumption increment ΔMeop, which is generated by increase in the driving electric power amount of the EOP 202 caused by moving the operating point of the EOP 202 from the current operating point P3 to the operating point P4 where the overall efficiency is the highest, is smaller than the fuel consumption decrement ΔMmop due to the transmission efficiency of the variable-capacity MOP 201 being enhanced by increase in the discharge flow volume of the EOP 202, the ECU 300 increases the discharge flow volume of the EOP 202 such that the required flow volume $Q_{Lub}$ for the lubrication pressure system is supplied only from the EOP 202 as illustrated in FIG. 14. Accordingly, the discharge flow volume of the variable-capacity MOP 201 can be decreased in proportion to the increase in the discharge flow volume of EOP 202, which makes it possible to enhance the fuel efficiency.

In a third modification, the ECU 300 preferably executes discharge volume control processing for setting the target discharge volume of the variable-capacity MOP 201 to a maximum discharge volume, when the fuel supply to the engine 1 is stopped. The discharge volume control processing will be described in detail below with reference to FIG. 15.

Figure 15:
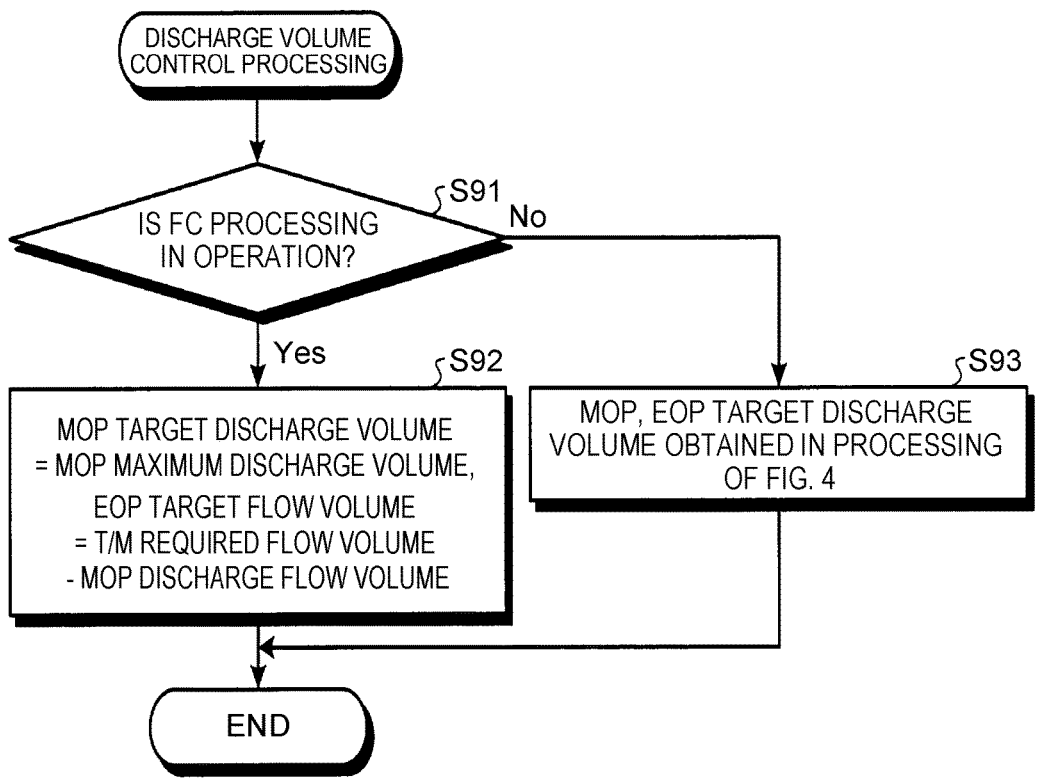
FIG. 15 is a flowchart illustrating the flow of discharge volume control processing that is one embodiment of the present disclosure.

FIG. 15 is a flowchart illustrating the flow of the discharge volume control processing that is one embodiment of the present disclosure. The flowchart illustrated in FIG. 15 starts at the timing when the ignition switch of the vehicle Ve is switched from an OFF state to an ON state. Then, the discharge volume control processing proceeds to step S91.

In the processing of step S91, the ECU 300 determines whether or not fuel cut (FC) processing that stops fuel supply to the engine 1 is in operation. Whether or not the FC processing is in operation can be determined by detecting the state of an FC flag that indicates whether or not the FC processing is in operation. As a result of determination, when the FC processing is in operation (step S91: Yes), the ECU 300 advances the discharge volume control processing to step S92. When the FC processing is not in operation (step S91: No), the ECU 300 advances the discharge volume control processing to step S93.

In the processing of step S92, the ECU 300 sets the target discharge volume of the variable-capacity MOP 201 to the maximum discharge volume, and sets the target flow volume of the EOP 202 to a value obtained by subtracting the discharge flow volume of the variable-capacity MOP 201 from the T/M required flow volume. Accordingly, the control processing of step S92 is completed, and a series of the discharge volume control processing steps are terminated.

In the processing of step S93, the ECU 300 controls the target discharge volume of the variable-capacity MOP 201 and the EOP 202 in accordance with the target discharge volume obtained in the hydraulic control processing illustrated in FIG. 4. Accordingly, the control processing of step S93 is completed, and a series of the discharge volume control processing steps are terminated. After this point, the ECU 300 repeatedly executes the discharge volume control processing, whenever predetermined time elapses after the discharge volume control processing is ended.

Figure 16:
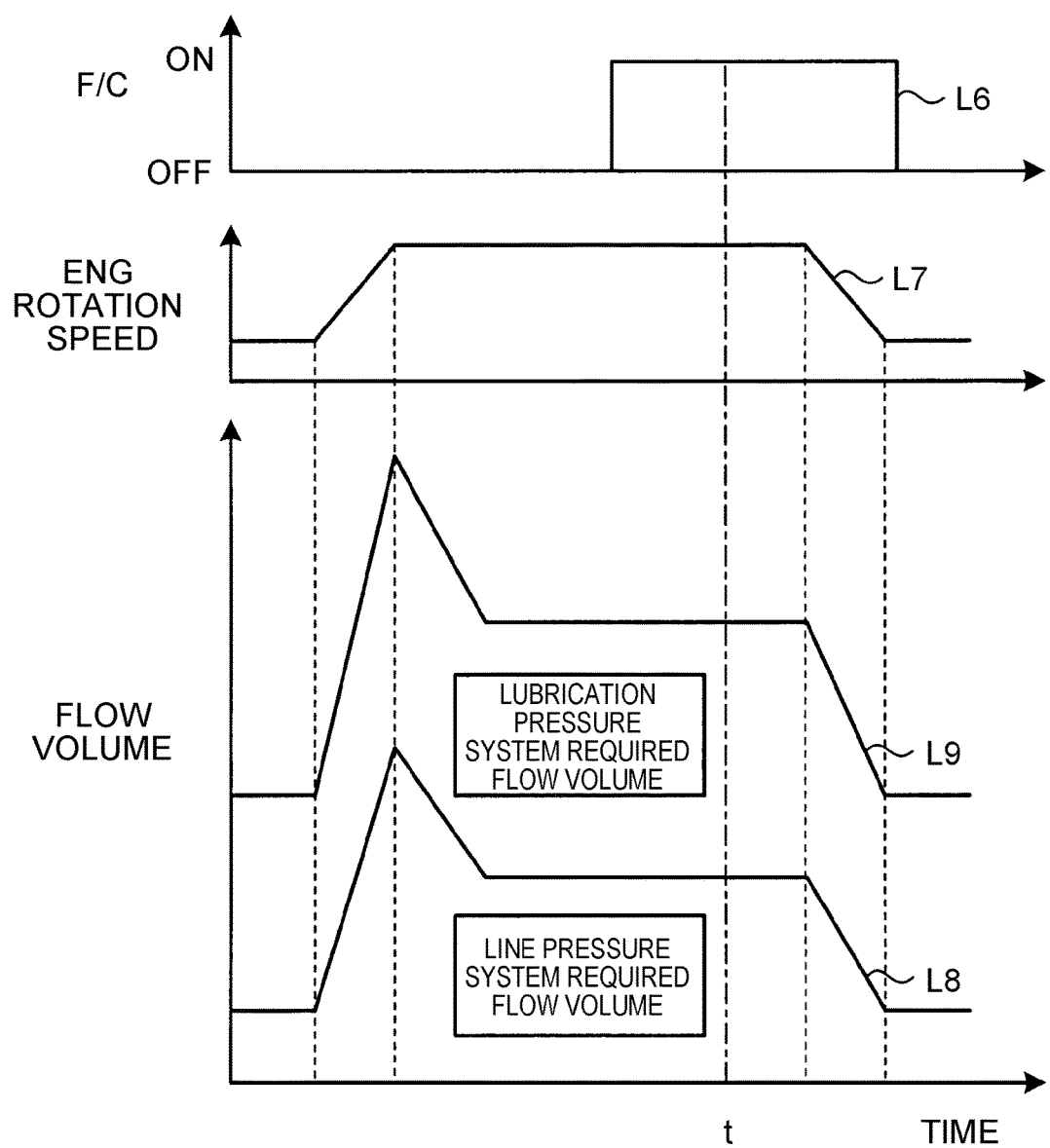
FIG. 16 illustrates one example of temporal change in the required flow volume for the line pressure system and the required flow volume for the lubrication pressure system versus temporal change in the engine rotation speed.
Figure 17:
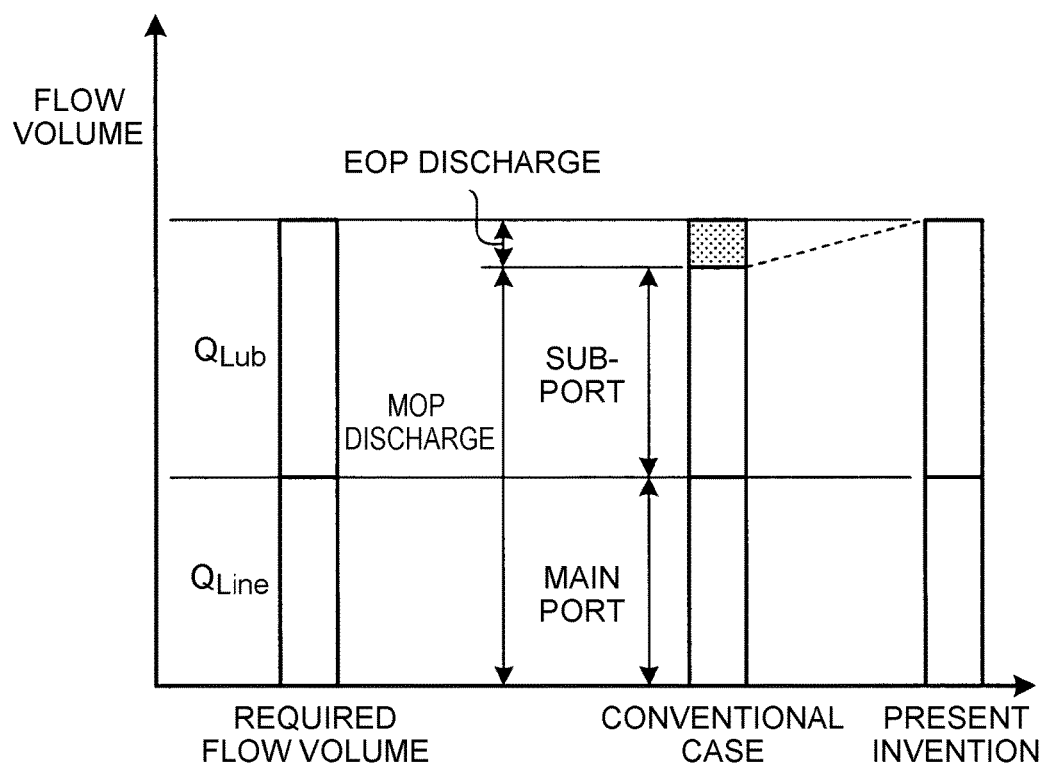
FIG. 17 illustrates the discharge flow quantities of the variable-capacity MOP and EOP in the discharge volume control processing in a conventional example and in the present disclosure.

A description is now given of the effect of the discharge volume control processing with reference to FIGS. 16 and 17. FIG. 16 illustrates one example of temporal change in the required flow volume for the line pressure system and the required flow volume for the lubrication pressure system versus temporal change in the engine rotation speed. FIG. 17 illustrates discharge flow quantities of the variable-capacity MOP 201 and the EOP 202 in the discharge volume control processing in a conventional example and in the present disclosure.

Consider the case where the required flow quantities for the line pressure system and the lubrication pressure system change in accordance with change in engine rotation speed as illustrated in FIG. 16. In FIG. 16, a line L6 represents ON and OFF of the FC processing, a line L7 represents the engine rotation speed, a line L8 represents the required flow volume for the line pressure system, and a line L9 represents the required flow volume for the lubrication pressure system. In this case, in conventional discharge volume control processing, at time t when the FC processing is set to ON, the variable-capacity MOP 201 (main port and sub-port) is used to supply the required flow volume $Q_{Line}$ for the line pressure system and part of the required flow volume $Q_{Lub}$ for the lubrication pressure system, while the EOP 202 is used to supply a portion of the required flow volume for the lubrication pressure system that is not sufficiently supplied from the variable-capacity MOP 201 as illustrated in FIG. 17.

Contrary to this, in the discharge volume control processing that is one embodiment of the present disclosure, At time t when the FC processing is set to ON, the ECU 300 sets the target discharge volume of the variable-capacity MOP 201 to the maximum discharge volume so as to increase the discharge flow volume of the variable-capacity MOP 201 as illustrated in FIG. 17. As a result, the discharge flow volume of the EOP 202 can be decreased to reduce electric power consumption of the EOP 202 while the FC processing is in operation. This makes it possible to suppress deterioration of fuel efficiency during the FC processing.

Figure 18:
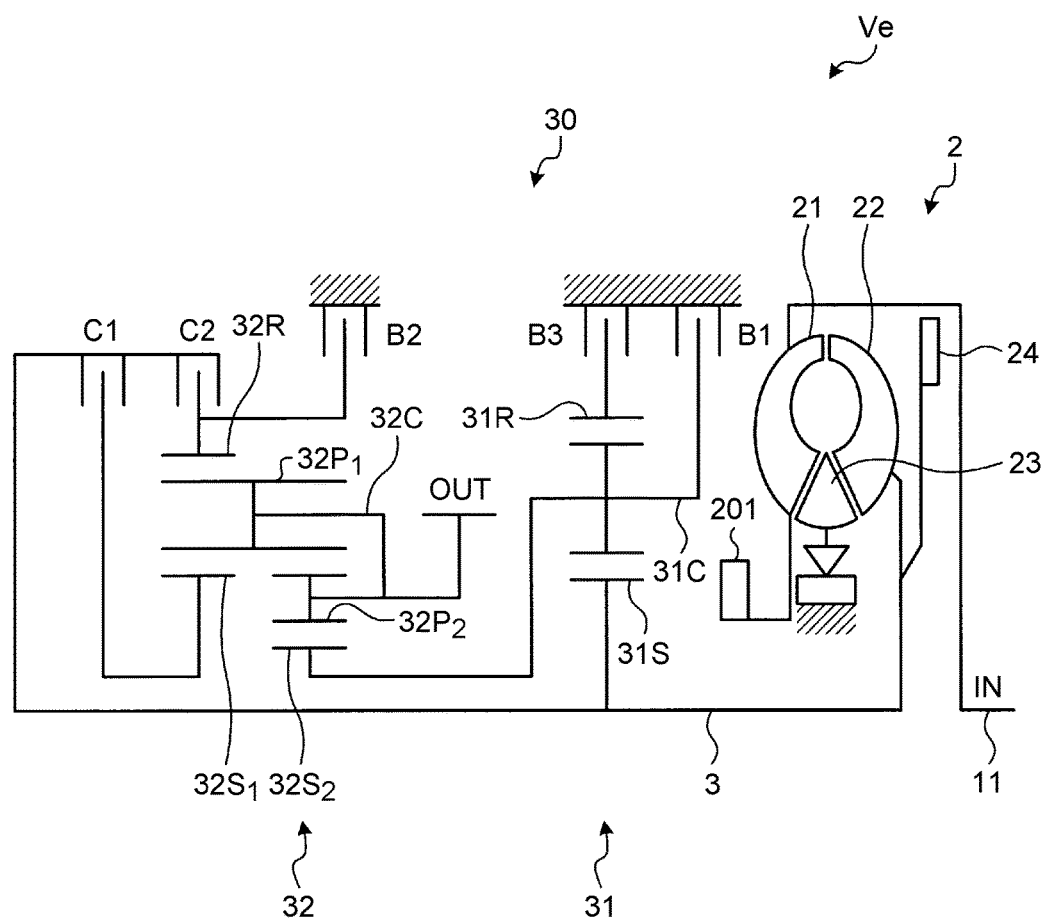
FIG. 18 is a schematic view illustrating another configuration example of the vehicle incorporating the vehicular hydraulic control device that is one embodiment of the present disclosure.

In this embodiment as the fourth modification, the present disclosure is applied to the vehicle including a continuously variable transmission (CVT) as a transmission. However, without being limited to the present embodiment, the present disclosure is applicable to a vehicle including an automatic transmission (AT) as a transmission as illustrated in FIG. 18. However, in applying the present disclosure to the vehicle including the AT, the T/M target flow volume is calculated by using a gear stage as a parameter in place of the target gear ratio. The configuration of the vehicle including the AT illustrated in FIG. 18 will be described below. Component members similar in configuration to those of the vehicle Ve illustrated in the FIG. 1 are designated by similar reference marks to omit the description thereof.

FIG. 18 is a schematic view illustrating another configuration example of the vehicle incorporating the vehicular hydraulic control device that is one embodiment of the present disclosure. As illustrated in FIG. 18, a vehicle Ve in another configuration example incorporates an automatic transmission 30 that can be set to a plurality of shift stages. The vehicle Ve also includes a plurality of engagement devices for shifting. The automatic transmission 30 includes a single-type first planetary gear mechanism 31, a Ravigneau-type second planetary gear mechanism 32 having four rotation elements, a plurality of clutches C1, C2, and a plurality of brakes B1 to B3. Each of the clutches C1, C2 and the brakes B1 to B3 is a hydraulic engagement device that is brought into frictional engagement by a hydraulic actuator. The hydraulic actuator, which is included in a clutch system, receives hydraulic pressure supplied by a hydraulic circuit 200 (not illustrated).

When the clutches C1, C2 and the brakes B1 to B3 are switched between an engagement state and a disengagement state, the automatic transmission 30 can establish gear stages including six forward gear stages and a reverse gear stage. For example, when any two among the two clutches C1, C2 and the three brakes B1 to B3 are engaged, a multi-stage transmission having six forward stages can be achieved. The first planetary gear mechanism 31 includes a sun gear 31S integrally rotating with an input shaft 3, a carrier 31C selectively fixed by the brake B1, and a ring gear 31R selectively fixed by the brake B3.

The second planetary gear mechanism 32 includes a first sun gear $32S_1$, a second sun gear $32S_2$, a ring gear 32R, a long pinion gear $32P_1$, a short pinion gear $32P_2$, and a carrier 32C. The first sun gear $32S_1$ is selectively and integrally rotated with the sun gear 31S by the clutch C1. The second sun gear $32S_2$ integrally rotates with the carrier 31C. The ring gear 32R is selectively and integrally rotated with the sun gear 31S and the input shaft 3 by the first clutch C1, and is selectively fixed by the brake B2. The long pinion gear $32P_1$ gears with the second sun gear $32S_2$, the ring gear $32R$, and the short pinion gear $32P_2$. The carrier $32C$ rotationally and revolvably retains each of the pinion gears $32P_1$, $32P_2$, while integrally rotating with an output gear (OUT).

Although the embodiments that embody the disclosure made by the inventors of the present disclosure have been described in the foregoing, the present disclosure is not restricted by the description and the drawings that constitute part of the disclosure of the present disclosure made by the present embodiments. That is, other embodiments, examples, operation techniques, or the like made by those skilled in the art based on the embodiments disclosed are embraced in their entirety in the scope of the present disclosure.

What is claimed is:

1. A hydraulic control device for a vehicle,
the vehicle including
   an engine, and
   a transmission,
the hydraulic control device comprising:
   a mechanical variable-capacity oil pump driven by the engine, and configured to supply hydraulic pressure to a drive unit of the vehicle;
   an electronic control unit configured to
      (i) calculate a target discharge volume of the mechanical variable-capacity oil pump using a plurality of parameters of the transmission, and
      (ii) control the mechanical variable-capacity oil pump based on the target discharge volume,
   wherein the plurality of parameters includes at least one of a target input torque of the transmission of the vehicle, a target discharge flow volume of the mechanical variable-capacity oil pump, and a rotation speed of an input shaft of the vehicle, and
   wherein the electronic control unit is configured to calculate a volumetric efficiency of the mechanical variable-capacity oil pump from the target input torque of the transmission and from the rotation speed of the input shaft, and set the target discharge volume to be larger as the volumetric efficiency becomes lower.

2. A hydraulic control device for a vehicle,
the vehicle including
   an engine, and
   a transmission,
the hydraulic control device comprising:
   a mechanical variable-capacity oil pump driven by the engine, and configured to supply hydraulic pressure to a drive unit of the vehicle;
   an electronic control unit configured to
      (i) calculate a target discharge volume of the mechanical variable-capacity oil pump using a plurality of parameters of the transmission, and
      (ii) control the mechanical variable-capacity oil pump based on the target discharge volume,
The hydraulic control device according to claim 1, wherein the plurality of parameters includes at least one of a target input torque of the transmission of the vehicle, a target discharge flow volume of the mechanical variable-capacity oil pump, and a rotation speed of an input shaft of the vehicle,
   the hydraulic control device further comprising an electric oil pump configured to supply hydraulic pressure to the drive unit,
   wherein the electronic control unit is configured to:
      (i) calculate amount of fuel consumption of the engine corresponding to an increment of a driving electric power amount of the electric oil pump when the electric oil pump is driven at an operating point more efficient than a current operating point;
      (ii) compare the amount of fuel consumption of the engine corresponding to the increment of the driving electric power amount of the electric oil pump, with a decrease amount of fuel consumption of the engine caused by decrease in the discharge flow volume of the mechanical variable-capacity oil pump; and
      (iii) when the decrease amount is larger than the fuel consumption corresponding to the increment of a driving electric power amount of the electric oil pump, drive the electric oil pump at the operating point more efficient than the current operating point, with driving the mechanical variable-capacity oil pump such that the discharge flow volume of the mechanical variable-capacity oil pump is decreased.

3. A hydraulic control device for a vehicle,
the vehicle including
   an engine, and
   a transmission,
the hydraulic control device comprising:
   a mechanical variable-capacity oil pump driven by the engine, and configured to supply hydraulic pressure to a drive unit of the vehicle;
   an electronic control unit configured to
      (i) calculate a target discharge volume of the mechanical variable-capacity oil pump using a plurality of parameters of the transmission, and
      (ii) control the mechanical variable-capacity oil pump based on the target discharge volume,
   wherein the electronic control unit is configured to set the target discharge volume of the mechanical variable-capacity oil pump to a maximum discharge volume, when fuel supply to the engine is stopped.

4. A hydraulic control method for a vehicle,
the vehicle including
an engine,
a transmission,
a mechanical variable-capacity oil pump driven by the engine, and configured to supply hydraulic pressure to a drive unit of the vehicle, and
an electronic control unit,
   the hydraulic control method comprising:
      (i) calculating, by the electronic control unit, a target discharge volume of the mechanical variable-capacity oil pump using a plurality of parameters of the transmission; and
      (ii) controlling, by the electronic control unit, the mechanical variable-capacity oil pump based on the target discharge volume,
   wherein the plurality of parameters includes at least one of a target input torque of the transmission of the vehicle, a target discharge flow volume of the mechanical variable-capacity oil pump, and a rotation speed of an input shaft of the vehicle, and
   wherein the electronic control unit is configured to calculate a volumetric efficiency of the mechanical variable-capacity oil pump from the target input torque of the transmission and from the rotation speed of the input shaft, and set the target discharge volume to be larger as the volumetric efficiency becomes lower.

5. A hydraulic control method for a vehicle,
the vehicle including
an engine,
a transmission, a mechanical variable-capacity oil pump driven by the engine, and configured to supply hydraulic pressure to a drive unit of the vehicle, and an electronic control unit, the hydraulic control method comprising:

(i) calculating, by the electronic control unit, a target discharge volume of the mechanical variable-capacity oil pump using a plurality of parameters of the transmission; and (ii) controlling, by the electronic control unit, the mechanical variable-capacity oil pump based on the target discharge volume, wherein the plurality of parameters includes at least one of a target input torque of the transmission of the vehicle, a target discharge flow volume of the mechanical variable-capacity oil pump, and a rotation speed of an input shaft of the vehicle, wherein the hydraulic control device further comprising an electric oil pump configured to supply hydraulic pressure to the drive unit, wherein the method further comprises:

(iii) calculating an amount of fuel consumption of the engine corresponding to an increment of a driving electric power amount of the electric oil pump when the electric oil pump is driven at an operating point more efficient than a current operating point;

(iv) comparing the amount of fuel consumption of the engine corresponding to the increment of the driving electric power amount of the electric oil pump, when a decrease amount of fuel consumption of the engine is caused by decrease in the discharge flow volume of the mechanical variable-capacity oil pump; and (v) when the decrease amount is larger than the fuel consumption corresponding to the increment of a driving electric power amount of the electric oil pump, driving the electric oil pump at the operating point more efficient than the current operating point, while driving the mechanical variable-capacity oil pump such that the discharge flow volume of the mechanical variable-capacity oil pump is decreased.

6. A hydraulic control method for a vehicle, the vehicle including an engine, a transmission, a mechanical variable-capacity oil pump driven by the engine, and configured to supply hydraulic pressure to a drive unit of the vehicle, and an electronic control unit, the hydraulic control method comprising:

(i) calculating, by the electronic control unit, a target discharge volume of the mechanical variable-capacity oil pump using a plurality of parameters of the transmission; and (ii) controlling, by the electronic control unit, the mechanical variable-capacity oil pump based on the target discharge volume, wherein the electronic control unit is configured to set the target discharge volume of the mechanical variable-capacity oil pump to a maximum discharge volume, when fuel supply to the engine is stopped.

* * * * *